United States Patent
Frischmann et al.

(10) Patent No.: US 11,545,724 B2
(45) Date of Patent: Jan. 3, 2023

(54) MICROSTRUCTURED ION-CONDUCTING COMPOSITES AND USES THEREOF

(71) Applicants: SEPION TECHNOLOGIES, INC., Emeryville, CA (US); THE REGENTS OF THE UNIVERSITY OF CALIFORNIA, Oakland, CA (US)

(72) Inventors: Peter David Frischmann, Berkeley, CA (US); Brett Anthony Helms, Oakland, CA (US)

(73) Assignees: The Regents of the University of California, Oakland, CA (US); Sepion Technologies. Inc., Emeryville, CA (US)

(*) Notice: Subject to any disclaimer, the term of this patent is extended or adjusted under 35 U.S.C. 154(b) by 17 days.

(21) Appl. No.: 16/465,013

(22) PCT Filed: Dec. 7, 2017

(86) PCT No.: PCT/US2017/065174
§ 371 (c)(1),
(2) Date: May 29, 2019

(87) PCT Pub. No.: WO2018/106957
PCT Pub. Date: Jun. 14, 2018

(65) Prior Publication Data
US 2019/0326578 A1    Oct. 24, 2019

Related U.S. Application Data

(60) Provisional application No. 62/431,300, filed on Dec. 7, 2016.

(51) Int. Cl.
*H01M 50/46* (2021.01)
*H01M 4/131* (2010.01)
(Continued)

(52) U.S. Cl.
CPC ........... *H01M 50/46* (2021.01); *H01M 4/131* (2013.01); *H01M 4/133* (2013.01);
(Continued)

(58) Field of Classification Search
CPC ......... H01M 2/14–1673; H01M 2/166; H01M 4/02–131; H01M 10/0525;
(Continued)

(56) References Cited

U.S. PATENT DOCUMENTS

| | | |
|---|---|---|
| 4,397,922 A | 8/1983 | Pokhodenko et al. |
| 4,485,154 A | 11/1984 | Remick et al. |

(Continued)

FOREIGN PATENT DOCUMENTS

| | | |
|---|---|---|
| CN | 107213807 A | 9/2017 |
| JP | S62252067 A | 11/1987 |

(Continued)

OTHER PUBLICATIONS

Carta, et al., Novel spirobisindanes for use as precursors to polymers of intrinsic microporosity, Organic Letters, Mar. 15, 2008, pp. 2641-2643, vol. 10, No. 13.
(Continued)

*Primary Examiner* — Jonathan G Jelsma
*Assistant Examiner* — Niara Trant
(74) *Attorney, Agent, or Firm* — Mintz, Levin, Cohn, Ferris, Glovsky and Popeo, P.C.

(57) ABSTRACT

A composite membrane with nanostructured inorganic and organic phases is applied as an ion-selective layer to prove processability, prevent dendrite shorting, and increase power output of lithium-metal anodes through better Li-ion conductivity. Nanoconfinement, as opposed to macroscale confinement, is known to dramatically alter the properties of bulk materials. Control over a ceramic's size, shape, and properties is achieved with polymer templates. This is a new (Continued)

composition of matter and unique approach to composite membrane design.

15 Claims, 13 Drawing Sheets

(51) Int. Cl.
  *H01M 4/133*       (2010.01)
  *H01M 10/0525*     (2010.01)
  *H01M 10/0569*     (2010.01)
  *H01M 50/446*      (2021.01)

(52) U.S. Cl.
  CPC ... *H01M 10/0525* (2013.01); *H01M 10/0569* (2013.01); *H01M 50/446* (2021.01)

(58) Field of Classification Search
  CPC ............. H01M 10/056; H01M 4/133; H01M 10/0569; H01M 50/40; H01M 50/409; H01M 50/431; H01M 50/434; H01M 50/437; H01M 50/451; H01M 50/489; H01M 50/491; H01M 50/497; H01M 50/46
  USPC ............................................. 429/144
  See application file for complete search history.

(56) References Cited

U.S. PATENT DOCUMENTS

| | | |
|---|---|---|
| 4,592,973 A | 6/1986 | Pemsler et al. |
| 5,858,264 A | 1/1999 | Ichino et al. |
| 6,586,138 B2 | 7/2003 | Pekala et al. |
| 7,690,514 B2 | 4/2010 | McKeown et al. |
| 7,758,751 B1 | 7/2010 | Liu et al. |
| 8,056,732 B2 | 11/2011 | McKeown et al. |
| 9,481,939 B2 | 11/2016 | Masel et al. |
| 9,580,824 B2 | 2/2017 | Masel et al. |
| 9,815,032 B2 | 11/2017 | Hill et al. |
| 10,710,065 B2 | 7/2020 | Helms et al. |
| 10,862,093 B2 | 12/2020 | Hatta et al. |
| 2004/0044100 A1 | 3/2004 | Schlenoff et al. |
| 2005/0147891 A1 | 7/2005 | Mikhaylik et al. |
| 2006/0134526 A1 | 6/2006 | Han et al. |
| 2006/0246273 A1 | 11/2006 | McKeown et al. |
| 2007/0264577 A1 | 11/2007 | Katayama et al. |
| 2009/0050199 A1 | 2/2009 | Bartholomew et al. |
| 2009/0136844 A1 | 5/2009 | Watanabe et al. |
| 2009/0155678 A1* | 6/2009 | Less ................. H01M 10/0585 429/144 |
| 2010/0003570 A1 | 1/2010 | Finsterwalder et al. |
| 2010/0261065 A1 | 10/2010 | Babinec et al. |
| 2012/0264589 A1 | 10/2012 | Du et al. |
| 2013/0029232 A1 | 1/2013 | Zheng et al. |
| 2014/0212748 A1 | 7/2014 | Zhang et al. |
| 2014/0255636 A1 | 9/2014 | Odeh et al. |
| 2014/0287323 A1 | 9/2014 | Lu et al. |
| 2016/0118636 A1 | 4/2016 | Jin et al. |
| 2016/0285064 A1 | 9/2016 | Hatta et al. |
| 2016/0367948 A1 | 12/2016 | Song et al. |
| 2017/0077503 A1 | 3/2017 | Erickson et al. |
| 2017/0346104 A1 | 11/2017 | Helms et al. |
| 2018/0085744 A1* | 3/2018 | Helms ..................... B01J 41/13 |
| 2019/0109310 A1 | 4/2019 | Masel et al. |
| 2019/0245242 A1 | 8/2019 | Tan et al. |
| 2019/0348657 A1 | 11/2019 | Frischmann et al. |
| 2020/0006796 A1 | 1/2020 | Su et al. |
| 2020/0306745 A1 | 10/2020 | Helms et al. |
| 2021/0013536 A1 | 1/2021 | Golden et al. |
| 2021/0309802 A1 | 10/2021 | Helms et al. |

FOREIGN PATENT DOCUMENTS

| | | |
|---|---|---|
| KR | 20140147742 A | 12/2014 |
| WO | WO-2005/012397 | 2/2005 |
| WO | WO-2005/113121 | 12/2005 |
| WO | 2009026467 A1 | 2/2009 |
| WO | WO-2012/129411 | 9/2012 |
| WO | WO-2013/005050 | 1/2013 |
| WO | 2015013478 A1 | 9/2015 |
| WO | 2015134783 A1 | 9/2015 |
| WO | WO-2016/161367 | 10/2016 |
| WO | WO-2017/075577 | 5/2017 |
| WO | WO-2017/117373 | 7/2017 |
| WO | 2018064365 A1 | 4/2018 |
| WO | 2019006045 A1 | 1/2019 |
| WO | WO-2020/006436 | 1/2020 |
| WO | 2020037246 A1 | 2/2020 |
| WO | WO-2020/264386 | 12/2020 |
| WO | 2021224825 A1 | 11/2021 |

OTHER PUBLICATIONS

International Bureau, International Preliminary Report on Patentability for International Application No. PCT/US17/54069.
International Searching Authority at the United States Patent and Trademark Office, International Search Report and Written Opinion for International Application No. PCT/US17/54069, dated Apr. 11, 2019, 10 pages.
International Searching Authority at the United States Patent and Trademark Office, International Search Report and Written Opinion for International Application No. PCT/US17/65174, dated Mar. 7, 2018, 7 pages.
Li, et al., Polysulfide-blocking microporous polymer membrane tailored for hybrid Li-Sulfur flow batteries, Nana Letters, Aug. 3, 2015, pp. 5724-5729, vol. 15, No. 9.
Aetukuri et al., "Flexible Ion-Conducting Composite Membranes for Lithium Batteries," Advanced Energy Materials, 5(14), p. 1500265 (2015).
Ahn et al., "Gas transport behavior of mixed-matrix membranes composed of silica nanoparticles in a polymer of intrinsic microporosity (PIM-1)," Journal of Membrane Science, 346(2), pp. 280-287 (2010).
Extended European Search Report dated Jun. 30, 2020 for European Patent Application No. 17878273.6 (9 pages).
Bisoi et al., "Gas separation properties of Troeger's base-bridged polyamides," e-Polymers, 17(4), 283-293 (2017).
Carta et al., "The synthesis of microporous polymers using Troger's base formation," Polymer Chemistry, 5, 5267-5272 (2014).
Du et al. "Azide-Based Cross-Linking of Polymers of Intrinsic Microporosity (PI Ms) for Condensable Gas Separation," Macromolecular Rapid Communications, vol. 32, No. 8, 2011, pp. 631-636 (2011).
Hart and Colina, "Ionomers of Intrinsic Microporosity: In Silica Development of Ionic-Functionalized Gas-Separation Membranes," Langmuir, 30(40), pp. 12039-12048 (2014).
Khan et al., "Cross-Linking of Polymer of Intrinsic Microporosity (PIM-1) via nitrene reaction and its effect on gas transport property," European Polymer Journal, 49, pp. 4157-4166 (2013).
Li et al., "Air-breathing aqueous sulfur flow battery for ultralowcost long-duration electrical storage," Joule, 1(2), 306-327 (2017).
Li et al., "A Polysulfide-Blocking Microporous Polymer Membrane Tailored for Hybrid Li-Sulfur Flow Batteries," ACS Nano Letters, Supporting Information, 11 pages (2015).
Madrid et al., "Metastable Ionic Diodes Derived from an Amine-Based Polymer of Intrinsic Microporosity," Angew. Chem. Int. Ed., 53, pp. 10751-10754 (2014).
McKeown et al., "Polymers of Intrinsic Microporosity (PIMS): Bridging the void between Microporous and Polymeric Materials," Chem. Eur. J., 11(9), pp. 2610-2620 (2005).
McKeown, "Polymers of Intrinsic Microporosity," International Scholarly Research Network, , Article ID 513986, 16 pages (2012).
Wei et al., "An aqueous redox flow battery based on neutral alkali metal ferri/ferrocyanide and polysulfide electrolytes," Journal of The Electrochemical Society, 163(1), A5150-A5153 (2015).
Extended European Search Report dated Mar. 27, 2020 for European Patent Application No. 17857439.8, 8 pages.

(56) References Cited

OTHER PUBLICATIONS

International Search Report and Written Opinion for International Patent Application No. PCT/US2016/025712, dated Oct. 6, 2016, 10 pages.
International Search Report and Written Opinion for International Patent Application No. PCT/US2020/039867, dated Nov. 15, 2019, 15 pages.
International Search Report and Written Opinion for PCT International Application No. PCT/US20/39942, dated Oct. 22, 2020, 15 pages.
International Search Report and Written Opinion for International Patent Application No. PCT/US2021/034203, dated Aug. 25, 2021, 9 pages.
Extended European Search Report issued in European Patent Application No. 19850375.7, dated Jan. 27, 2022, 5 pages.
International Search Report and Written Opinion received for PCT Application No. PCT/US2019/046886, dated Oct. 25, 2019, 8 pages.
Baran et al. (2019) "Design Rules for Membranes from Polymers of Intrinsic Microporosity for Crossover-free Aqueous Electrochemical Devices", JOULE, 3(12)12968-2985(19 pages).
Bengtson et al. (2017) "Membranes of Polymers of Intrinsic Microporosity (PIM-1) Modified by Poly(ethylene glycol)", Membranes, 7(28)11-21.
Budd et al. (2008) "Gas Permeation Parameters and Other Physicochemical Properties of a Polymer of Intrinsic Microporosity: Polybenzodioxane PIM-1", Journal of Membrane Science, 325(2)1851-860.
Doris et al. (Nov. 2016) "Understanding and Controlling the Chemical Evolution and Polysulfide-blocking Ability of Lithium-Sulfur Battery Membranes Cast from Polymers of Intrinsic Microporosity", Journal of Materials Chemistry A, 4(43)116946-16952.
Emmler et al. (2010) "Free Volume Investigation of Polymers of Intrinsic Microporosity (PIMs): PIM-1 and PIM1 Copolymers Incorporating Ethanoanthracene Units", Macromolecules, 43(14):6075-6084.
Gross et al. (2018) "Rechargeable Zinc-Aqueous Polysulfide Battery with a Mediator-Ion Solid Electrolyte", ACS Applied Materials & Interfaces, 10(13):10612-10617.
Li et al. (2018) "Engineered Transport in Microporous Materials and Membranes for Clean Energy Technologies", Advanced Materials, 30:1704953(33 pages).
McKeown et al. (2010) "Exploitation of Intrinsic Microporosity in Polymer-Based Materials", Macromolecules, 43 (12):5163-5176.
McKeown et al. (2006) "Polymers of Intrinsic Microporosity (PIMs): Organic Materials for Membrane Separations, Heterogeneous Catalysis and Hydrogen Storage", Chemical Society Reviews, 35(8):675-683.
Patel et al. (2012) "Noninvasive Functionalization of Polymers of Intrinsic Microporosity for Enhanced CO2 Capture", Chemical Communications, 48:9989-9991.
Rose et al. (2017) "Polymer Ultrapermeability from The Inefficient Packing of 2D Chains", Nature Materials, 16 (9):932-937.
Ward et al. (2017) "Materials Genomics Screens for Adaptive Ion Transport Behavior by Redox-Switchable Microporous Polymer Membranes in Lithium-Sulfur Batteries", ACS Central Science, 3(5):399-406.
Winsberg et al. (2017) "Aqueous 2,2,6,6-Tetramethylpiperidine-N-oxyl Catholytes for a High-Capacity and High Current Density Oxygen-Insensitive Hybrid-Flow Battery", ACS Energy Letters, 2(2):411-416.
Yin et al. (2018) "First Clear-Cut Experimental Evidence of a Glass Transition in a Polymer with Intrinsic Microporosity: PIM-1", Journal of Physical Chemistry Letters, 9(8):2003-2008.
Yuan et al. (2018) "Ion Conducting Membranes for Aqueous Flow Battery Systems", Chemical Communications, 54 (55):7570-7588.
Yuan et al. (May 25, 2018) "Toward a Low-Cost Alkaline Zinc-Iron Flow Battery with a Polybenzimidazole Custom Membrane for Stationary Energy Storage", iScience, 3:40-49.
Zhang et al. (2015) "Charged Porous Polymers using a Solid C—O Cross-Coupling Reaction", Chemistry, 21 (37):12866-12870.
Zhang et al. (2015) "Synthesis of Perfectly Alternating Copolymers for Polymers of Intrinsic Microporosity", Polymer Chemistry, 6:5003-5008.

\* cited by examiner

MICROSTRUCTURED ION-CONDUCTING COMPOSITES AND USES THEREOF

CROSS-REFERENCES TO RELATED APPLICATIONS

This application claims priority to U.S. Provisional Application No. 62/431,300, filed Dec. 7, 2016, which is incorporated in its entirety herein for all purposes.

STATEMENT OF GOVERNMENTAL SUPPORT

This invention was made with Government support under Grant No. DE-AC02-05CH11231, awarded by the U.S. Department of Energy, and Grant No. FA9550-11-C-0028, awarded by the U.S. Department of Defense. The Government has certain rights in this invention.

BACKGROUND OF THE INVENTION

Over the past ten years, incredible progress has been made in manufacturing affordable lithium-ion (Li-ion) batteries. These advances have ushered in an age of electrification, where everything—from the computers in our pockets to the cars we drive—can be powered by Li-ion battery technology. Unfortunately, the demand for energy by any of these applications is already placing strain on the battery industry, which is nearing the fundamental limits of storage capacity for conventional battery electrodes. Without alternatives, the amount of energy that can be fit into every Li-ion battery will plateau at a level below what is needed to sustainably electrify transportation. Essential for our future are technological innovations that enable more energy-dense electrodes to displace conventional graphite anodes or lithium cobalt oxide cathodes presently used in Li-ion batteries. Such innovations boost EV range and lighten battery packs for improved energy efficiency.

Today's Li-ion batteries overwhelmingly use graphite anodes to store charge. Historically, this market trend has followed the commercialization successes of Sony in the 1990s, who developed batteries for mobile devices. Unfortunately, graphite anodes fundamentally limit the energy density of the battery. Specifically, for every electron and lithium ion that is stored in graphite after a battery charge, six space-wasting carbon atoms are needed. Use of a pure lithium metal (Li-metal) as the anode avoids such waste, yielding a 10-fold improvement in anode capacity.

Despite the allure of Li-metal anodes, its risk of catastrophic battery failure has proven an unmitigable challenge with even the most advanced technology today. While charging, Li metal electroplates as unwanted needle-like growths, called dendrites, instead of desirable, smooth sheets at the anode. These dendrites propagate until the anode and cathode are bridged by conductive lithium resulting in an unwanted electronic connection between the two sides of the battery, shorting it and causing fires. By placing a high-performance membrane between the electrodes this problem may be overcome. The ideal membrane for a safe Li-metal anode must have the following qualities: 1) electronically insulating, 2) ionically conductive (<5 Ohm-cm$^2$ area specific resistance—ASR), 3) dendrite blocking, 4) processable into thin sheets for ease of manufacturing (<20 µm), 5) electrochemically stable, and 6) low-cost (<$10/m$^2$). Both polymer and ceramic membranes have been tested to solve the Li-dendrite problem with mixed results. While polymer membranes offer processing and cost advantages, ceramic membranes exhibit more desirable ion conduction and dendrite blocking capabilities.

BRIEF SUMMARY OF THE INVENTION

A hybrid polymer-ceramic composite membrane that weds the advantages of each material to deliver breakthrough performance protecting Li-metal anodes for safe, high-power, and energy-dense Li-metal batteries. Batteries equipped with the membranes will double the gravimetric energy density of today's Li-ion batteries. This innovation focuses on the application of porous polymers (10-40% porosity, 0.5-2.0 nm pores) as templates that deliver easily-processed precursors of Li-ion conducting ceramic materials as a conformal coating on the Li-metal surface. After standard polymer processing of our membrane onto lithium metal at near ambient temperature, the ceramic precursors, trapped in the nanopores of the polymer matrix, transform into a robust, percolating Li-conducting phase. Traditional inorganic Li-ion conductors must be processed at high temperature (>300° C.) and pressure resulting in brittle, small-area, and expensive membranes that are unfit for mass production or deployment in EVs. In contrast, the invention is amenable to large-scale polymer processing such as roll-to-roll coating, while maintaining the dendrite-blocking rigidity of ceramic Li-ion conductors essential to making Li-metal anodes a commercial reality.

Provided are electrochemical cells including separators permeable to some materials and impermeable to other materials in electrolytes. Also provided are methods of forming such separators. The selective permeability of a separator is achieved by its specific composition and morphology. Specifically, a species responsible for desirable ion transport in an electrochemical cell is allowed to pass through the separator, while another species is blocked thereby preventing degradation of the cell. For example, a species including alkali metal cations, such as lithium ions or sodium ions, is allowed to pass through the separator in rechargeable cells, while electrolyte solvent and other species are blocked. The membrane layer may be a standalone layer, supported by a membrane support, or supported by one of the electrodes.

In some embodiments, an electrochemical cell comprises a positive electrode, a negative electrode, a separator, and an electrolyte. The separator is disposed between the positive electrode and the negative electrode. The separator provides electronic isolation between the positive electrode and the negative electrode. The separator comprises a first membrane layer. The electrolyte comprising a first species and electrolyte solvent. At least a portion of the electrolyte is disposed within the separator. The separator, with at least the portion of the electrolyte is disposed within the separator, is permeable to the first species providing ionic communication between the positive electrode and the negative electrode. The separator, with at least the portion of the electrolyte is disposed within the separator, is substantially impermeable to the electrolyte solvent. The first species is selected from group consisting of H$^+$, Li$^+$, Na$^+$, Rb$^+$, Cs$^+$, F$^-$, Br$^-$, I$^-$, BF$_4^-$, PF$_6^-$, AsF$_6^-$, ClO$_4^-$, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifluoromethyl-imidazolate, dicyano-pentafluoroethyl-imidazoleate, and ion pairs thereof. The electrolyte solvent is any liquid that solvates the first species including, but not limited to $H_2O$, cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), sulfones, nitriles, dinitriles, carboxylates, and combinations thereof.

In some embodiments, the first membrane layer comprises a planar species and a linker having a site of contortion. The linker may be selected from the group consisting of a spiro group, a bridged ring moiety, and a sterically congested single covalent bond. The planar species may be represented by the following formula:

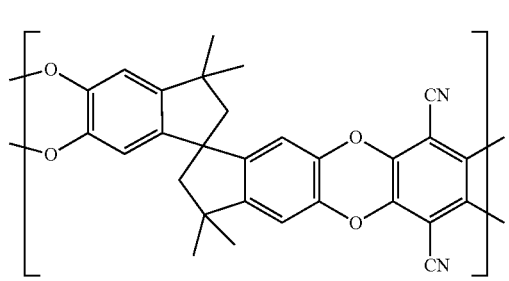

(2)

In some embodiments, the separator further comprises a membrane support laminated to the first membrane layer. The membrane support being permeable to the electrolyte solvent. The membrane support may be a porous polymer selected from the group consisting of polypropylene and polyethylene. The average pore diameter of the membrane support is at least about 10 nanometers. The first membrane layer may be disposed between the membrane support and the negative electrode.

In some embodiments, the separator further comprises a second membrane layer laminated to the membrane support. The membrane support may be disposed between the first membrane layer and the second membrane layer. The first membrane layer may be permeable to the first species providing ionic communication between the positive electrode and the negative electrode, and wherein the first membrane layer is substantially impermeable to liquid electrolyte. In some embodiments, the second membrane layer comprises a ceramic material selected from the group consisting of aluminum oxide, silicon oxide, silicon carbide, titanium dioxide, magnesium oxide, tin oxide, cerium oxide, zirconium oxide, barium titanite, yttrium oxide, boron nitride, and an ion conducting ceramic.

In some embodiments, the first membrane layer directly interfaces the negative electrode and the positive electrode.

These and other embodiments are described further below with reference to the figures.

BRIEF DESCRIPTION OF THE DRAWINGS

FIG. 1 describes an embodiment of the electrochemical cell with a separator (140) having a first membrane layer (144) separating the negative electrode (120) and the positive electrode (110).

FIG. 2 describes an embodiment of the electrochemical cell with a separator (140) having a first membrane layer (144) laminated on the negative electrode (120), with electrolyte (130) separating the first membrane layer (144) and the positive electrode (110).

FIG. 3 describes an embodiment of the electrochemical cell with a separator (140) having a first membrane layer (144) laminated to a membrane support (142) on the negative electrode side of the membrane support, with electrolyte (130) separating the positive electrode (110) and the membrane support (142), and separating the positive electrode (110) and the first membrane layer (144).

FIG. 4 describes an embodiment of the electrochemical cell with a separator (140) having a membrane support (142), with a first membrane layer (144) laminated to the negative electrode (120), with electrolyte (130) separating the positive electrode (110) and the membrane support (142), an electrolyte (130) separating the membrane support (142) and the first membrane layer (144).

FIG. 5 describes an embodiment of the electrochemical cell with a separator (140) having a first membrane layer (144) laminated to a membrane support (142) on the negative electrode side of the membrane support, and a second membrane layer (146) laminated to the membrane support on the positive electrode side of the membrane support, with electrolyte (130) separating the positive electrode (110) and the second membrane layer (146).

FIG. 6 describes an embodiment of the electrochemical cell with a separator (140) having a second membrane layer (146) laminated to a membrane support (142) on the positive electrode side of the membrane support, and a first membrane layer (144) laminated to the negative electrode (120), with electrolyte (130) separating the first membrane layer and the membrane support (142), and separating the positive electrode (110) and the second membrane layer (146).

FIG. 7 describes an embodiment of the electrochemical cell with a separator (140) having a second membrane layer (146) laminated to a membrane support (142) on the negative electrode side of the membrane support, and a first membrane layer (144) laminated to the second membrane layer on the negative side of the second membrane layer, with electrolyte (130) separating the membrane support (142) and the positive electrode (110).

DETAILED DESCRIPTION OF THE INVENTION

I. Definitions

Figure 1:
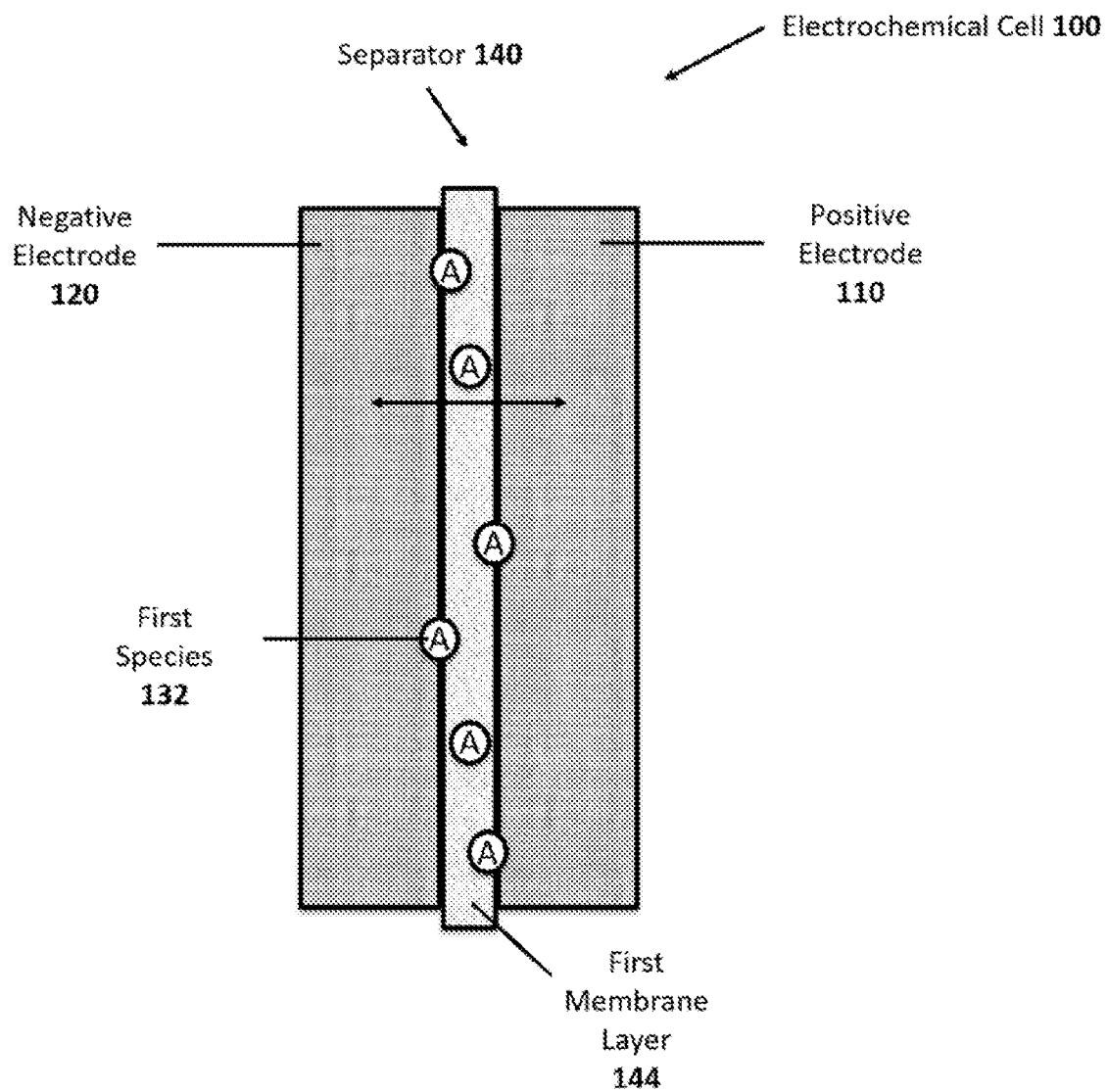
FIGS. 1-7 are schematic representations of different examples of electrochemical cells having different configurations of separators.

"Electrode" refers to an electrically conductive material in a circuit that is in contact with a nonmetallic part of the circuit, such as the electrolyte. The electrode can be a positive electrode or cathode, the electrode where reduction occurs. The electrode can be a negative electrode or anode, the electrode where oxidation occurs.

"Electrolyte" refers to a solution of the electrochemical cell that includes ions, such as metal ions and protons as well as anions, that provides ionic communication between the positive and negative electrodes.

"Electrolyte Solvent" refers to the molecules solvating ions in the liquid electrolyte, such as small organic carbonates or ethereal molecules, that enable diffusion of ions in the electrolyte. The Electrolyte Solvent may also be an ionic liquid or a gas at standard temperature and pressure.

"Separator" refers to an electrically insulating membrane between the positive and negative electrodes to prevent electrical shorts, i.e., provides electronic isolation. The separator also allows the ions to move between the positive and anode electrodes. The separator can include any suitable polymeric or inorganic material that is electrically insulating and porous. The separator can include several layers including one or more membrane layers, and a membrane support material for the membrane layers.

"First membrane layer" refers to a layer of the separator that is permeable to a first species of the electrolyte while substantially impermeable to liquid electrolyte. The membrane layer can be of any suitable material that can provide the selective permeability, such as composites of microporous polymers and inorganic materials. "Substantially impermeable" refers to less than 10% of the electrolyte solvent passing through the membrane layer, or less than 1%, or less than 0.1%, or less than 0.01%, or less than 0.001% of the liquid electrolyte passing through the membrane layer.

"Oxide" refers to a chemical compound having an oxygen, such as metal oxides or molecular oxides.

"Pore size" or "pore diameter" refers to the average diameter of interstitial space not occupied by the pore forming material. This may include, but is not limited to, the space remaining between polymer chains due to inefficient packing, the space remaining between organic linkers and metal ions in a metal-organic framework, the space between layers and within the holes of stacked 2D material, and the space left in an amorphous or semi-crystalline carbon due to unaligned covalent bonding. The pore size may also change once wetted with electrolyte or it may stay the same.

"Surface area" refers to the surface area of a porous material as measured by a variety of methods, such as nitrogen adsorption BET.

"Microporous polymer" refers to an amorphous glassy polymer having interconnected pores with an average diameter of less than 10 nm, or less than 5, 4, 3, 2, or less than 1 nm.

"Microporosity" refer to a layer of the membrane comprising pores of less than or equal to 2 nm in size.

"Intrinsic microporosity" is used herein to mean the polymer provides a continuous network of interconnected intermolecular voids (suitably of less than or equal to 2 nm in size), which forms as a direct consequence of the shape and rigidity (or concavity) of at least a proportion of the component monomers of the polymer. As will be appreciated by a person skilled in the art, intrinsic microporosity arises due to the structure of the monomers used to form the polymer and, as the term suggests, it is an intrinsic property of a polymer formed from such monomers. The shape and rigidity of the monomer used to form the polymer means that polymer possesses an internal molecular free volume (IMFV), which is a measure of the concavity of the monomers and is the difference between the volume of the concave monomer unity compared to that of the corresponding planar shape.

It is understood that the network polymers disclosed herein have a certain property (i.e. intrinsic microporosity). Disclosed herein are certain structural requirements in the monomers used for giving a polymer performing the disclosed function, and it is understood that there are a variety of structures that can perform the same function that are related to the disclosed monomer structures, and that these structures will typically achieve the same result.

"Metal" refers to elements of the periodic table that are metallic and that can be neutral, or negatively or positively charged as a result of having more or fewer electrons in the valence shell than is present for the neutral metallic element. Metals useful in the present invention include the alkali metals, alkali earth metals, transition metals and post-transition metals. Alkali metals include Li, Na, K, Rb and Cs. Alkaline earth metals include Be, Mg, Ca, Sr and Ba. Transition metals include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Post-transition metals include Al, Ga, In, Tl, Ge, Sn, Pb, Sb, Bi, and Po. Rare earth metals include Sc, Y, La, Ce, Pr, Nd, Sm, Eu, Gd, Tb, Dy, Ho, Er, Tm, Yb and Lu. One of skill in the art will appreciate that the metals described above can each adopt several different oxidation states, all of which are useful in the present invention. In some instances, the most stable oxidation state is formed, but other oxidation states are useful in the present invention.

"Membrane support" refers to any suitable material that is capable of supporting the membrane layer of the present invention, and is permeable to the first species and electrolyte solvent.

"Laminated" refers to the deposition of one layer on another, such as the membrane layer on the membrane support.

"Alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 20 carbons atoms, such as, but not limited to heptyl, octyl, nonyl, decyl, etc. Alkyl groups can be substituted or unsubstituted.

"Alkoxy" or "alkyl ether" refers to an alkyl group having an oxygen atom that connects the alkyl group to the point of attachment: alkyl-O—. As for alkyl group, alkoxy groups can have any suitable number of carbon atoms, such as $C_{1-6}$. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. Alkoxy groups can be substituted or unsubstituted.

"Alkyl-alkoxy" refers to a radical having an alkyl component and an alkoxy component, where the alkyl component links the alkoxy component to the point of attachment. The alkyl component is as defined above, except that the alkyl component is at least divalent, an alkylene, to link to the alkoxy component and to the point of attachment. The alkyl component can include any number of carbons, such as $C_{0-6}$, $C_{1-2}$, $C_{1-3}$, $C_{1-4}$, $C_{1-5}$, $C_{1-6}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. In some instances, the alkyl component can be absent. The alkoxy component is as defined above. Examples of the alkyl-alkoxy group include, but are not limited to, 2-ethoxy-ethyl and methoxymethyl.

"Halogen" refers to fluorine, chlorine, bromine and iodine.

"Haloalkyl" refers to alkyl, as defined above, where some or all of the hydrogen atoms are replaced with halogen atoms. As for alkyl group, haloalkyl groups can have any suitable number of carbon atoms, such as $C_{1-6}$. For example, haloalkyl includes trifluoromethyl, fluoromethyl, etc. In some instances, the term "perfluoro" can be used to define a compound or radical where all the hydrogens are replaced with fluorine. For example, perfluoromethyl refers to 1,1,1-trifluoromethyl.

"Haloalkoxy" refers to an alkoxy group where some or all of the hydrogen atoms are substituted with halogen atoms. As for an alkyl group, haloalkoxy groups can have any suitable number of carbon atoms, such as $C_{1-6}$. The alkoxy groups can be substituted with 1, 2, 3, or more halogens. When all the hydrogens are replaced with a halogen, for example by fluorine, the compounds are per-substituted, for example, perfluorinated. Haloalkoxy includes, but is not limited to, trifluoromethoxy, 2,2,2,-trifluoroethoxy, perfluoroethoxy, etc.

"Aryl" refers to an aromatic ring system having any suitable number of ring atoms and any suitable number of rings. Aryl groups can include any suitable number of ring atoms, such as, 6, 7, 8, 9, 10, 11, 12, 13, 14, 15 or 16 ring atoms, as well as from 6 to 10, 6 to 12, or 6 to 14 ring members. Aryl groups can be monocyclic, fused to form bicyclic or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Aryl groups can be substituted or unsubstituted.

"Aryl ether" or "aryloxy" refers to an aryl group, as defined above, linked via an oxygen atom to the remainder of the molecule.

The groups defined above can optionally be substituted by any suitable number and type of substituents. Representative substituents include, but are not limited to, halogen, haloalkyl, haloalkoxy, —OR', =O, —OC(O)R', —(O)R', —O₂R', —ONR'R'', —OC(O)NR'R'', =NR', =N—OR', —NR'R'', —NR''C(O)R', —NR'—(O)NR''R''', —NR''C(O)OR', —NH—(NH₂)=NH, —NR'C(NH₂)=NH, —NH—(NH₂)=NR', —SR', —S(O)R', —S(O)₂R', —S(O)₂NR'R'', —NR'S(O)₂R'', —N₃ and —NO₂. R', R'' and R''' each independently refer to hydrogen, unsubstituted alkyl, such as unsubstituted $C_{1-6}$ alkyl. Alternatively, R' and R'', or R'' and R''', when attached to the same nitrogen, are combined with the nitrogen to which they are attached to form a heterocycloalkyl or heteroaryl ring, as defined above.

II. Microstructured Ion-Conducting Composites

A. Electrodes

Positive electrode 110 may include a positive electrochemically active material some examples of which include, but are not limited to, $Li(M'_XM''_Y)O_2$, where M' and M'' are different metals (e.g., $Li(Ni_XMn_Y)O_2$, $Li(Ni_{1/2}Mn_{1/2})O_2$, $Li(Cr_XMn_{1-X})O_2$, $Li(Al_XMn_{1-X})O_2$), $Li(Co_XM_{1-X})O_2$, where M is a metal, (e.g., $Li(Co_XNi_{1-X})O_2$ and $Li(Co_XFe_{1-X})O_2$), $Li_{1-W}(Mn_XNi_YCo_Z)O_2$, (e.g., $Li(Co_XMn_Y Ni_{(1-X-Y)})O_2$, $Li(Mn_{1/3}Ni_{1/3}Co_{1/3})O_2$, $Li(Mn_{1/3}Ni_{1/3}Co_{1/3-X}Mg_X)O_2$, $Li(Mn_{0.4}Ni_{0.4}Co_{0.2})O_2$, $Li(Mn_{0.1}Ni_{0.8}Co_{0.1})O_2$, $Li_{1-W}(Mn_XNi_XCo_{1-2X})O_2$, $Li_{1-W}(Mn_XNi_YCoAl_W)O_2$, $Li_{1-W}(Ni_XCo_YAl_Z)O_2$ (e.g., $Li(Ni_{0.8}Co_{0.15}Al_{0.05})O_2$), $Li_{1-W}(Ni_XCo_YM_Z)O_2$, where M is a metal, $Li_{1-W}(Ni_XMn_YM_Z)O_2$, where M is a metal, $Li(Ni_{X-Y}Mn_YCr_{2-X})O_4$, $LiM'M''_2O_4$, where M' and M'' are different metals (e.g., $LiMn_{2-Y-Z}Ni_YO_4$, $LiMn_{2-Y-Z}Ni_YLi_ZO_4$, $LiMn_{1.5}Ni_{0.5}O_4$, $xLi_2MnO_3.(1-x)LiMO_2$, where M is a metal, $xLi_2MnO_3.(1-x)LiM_2O_4$, where M is a metal, $LiNiCuO_4$, $LiMn_{1-X}Al_XO_4$, $LiNi_{0.5}Ti_{0.5}O_4$, $Li_{1.05}Al_{0.1}Mn_{1.85}O_{4-Z}F_Z$, $Li_2MnO_3$) $Li_XV_YO_Z$, e.g., $LiV_3O_8$, $LiV_2O_5$, and $LiV_6O_{13}$, $LiMPO_4$ where M is a metal (e.g., $LiFePO_4$ $LiFe_XM_{1-X}PO_4$, where M is a metal), $LiVOPO_4$, $Li_3V_2(PO_4)_3$, and $LiMPO_4$. In general, the selection of a positive active material depends on several considerations, such as cell capacity, safety requirements, intended cycle life, etc. Lithium cobalt oxide ($LiCoO_2$) may be used in smaller cells that require higher gravimetric and/or volumetric capacities, such as portable electronics and medical devices. Cobalt may be partially substituted with Sn, Mg, Fe, Ti, Al, Zr, Cr, V, Ga, Zn, or Cu. Certain materials, such as lithium nickel oxide ($LiNiO_2$), may be less prone to thermal runaway. Other materials provide substantial cost advantage, such as lithium manganese oxide ($LiMnO_2$ or $LiMn_2O_4$ spinel). Furthermore, lithium manganese oxide has a relatively high power density because its three-dimensional crystalline structure provides more surface area, thereby permitting more ion flux between the electrodes. High-energy density lithium-rich layered oxides such as manganese-oxide composite electrodes may also be utilized where a layered $Li_2MnO_3$ component is integrated with a layered $LiMO_2$, where M is a metal, or spinel $LiM_2O_4$, where M is a metal.

Negative electrode 120 may include a negative electrochemically active material some examples of which include, but are not limited to carbon (e.g., in the form of graphite), lithium titanate (e.g., for high-power apps), silicon, silicon oxides (e.g., SiO and $SiO_2$), tin, germanium, various combinations of silicon and/or tin with carbon (e.g., blends of Si (and/or SiO) and Sn with graphite), sodium metal, lithium metal, and magnesium. Alloys of two or more negative electrochemically active materials may include, but are not limited to lithium-aluminum, silicon oxide-silicon, lithium-silicon, lithium-carbon, carbon-silicon, and carbon-silicon oxide. One having ordinary skills in the art would understand that some of these negative materials are more susceptible to degradation if electrolyte solvent 134 cross through separator 140 and contaminate negative electrode 120. For example, transition metals are highly undesirable contaminants of negative electrodes 120 that include carbon (e.g., graphite electrodes).

B. Separators

Separator 140 may include at least one membrane layer, such as first membrane layer 144 shown in FIG. 1A. First membrane layer 144 may define permeability characteristics of separator. For example, first membrane layer 144 and separator 140 may be permeable to first species 132 and substantially impermeable or completely impermeable to electrolyte solvent 134.

Figure 5:
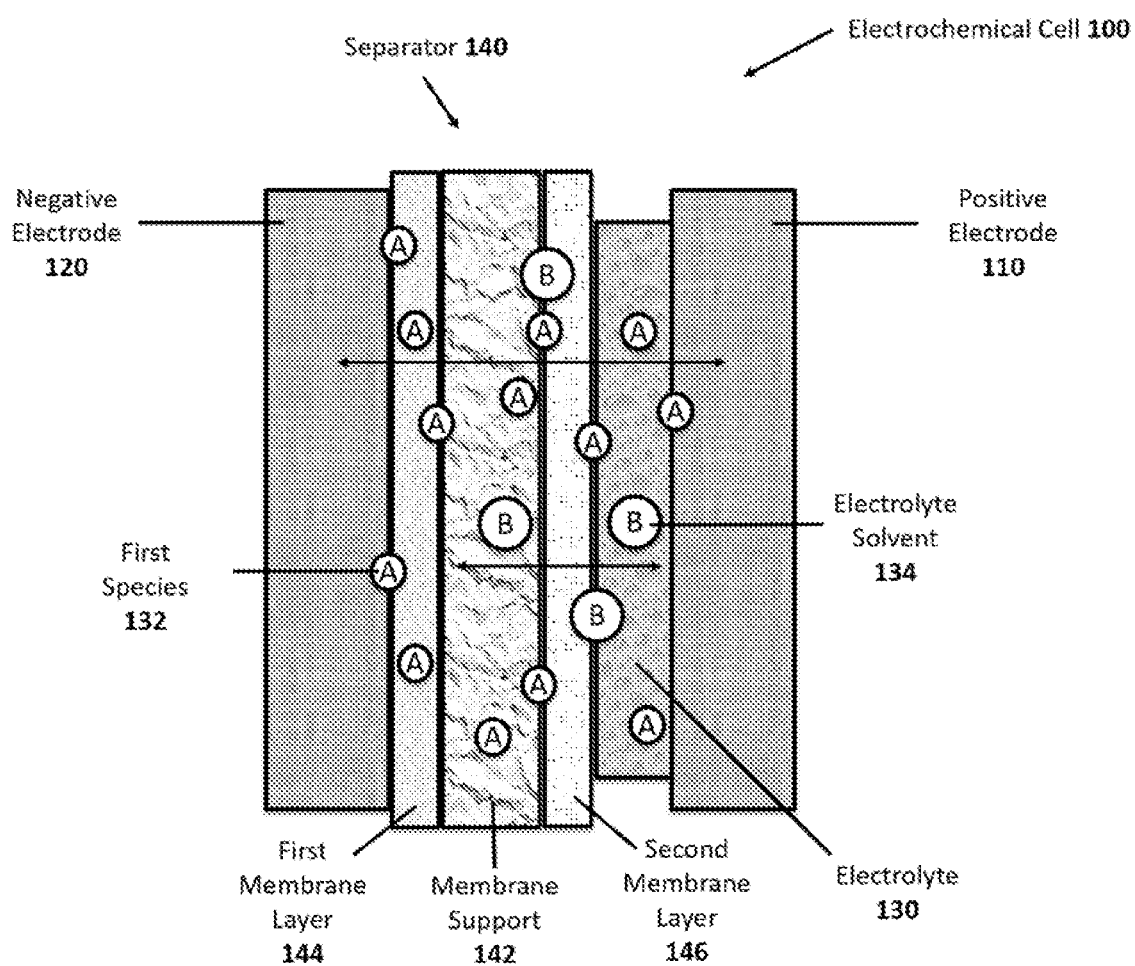
Figure 6:
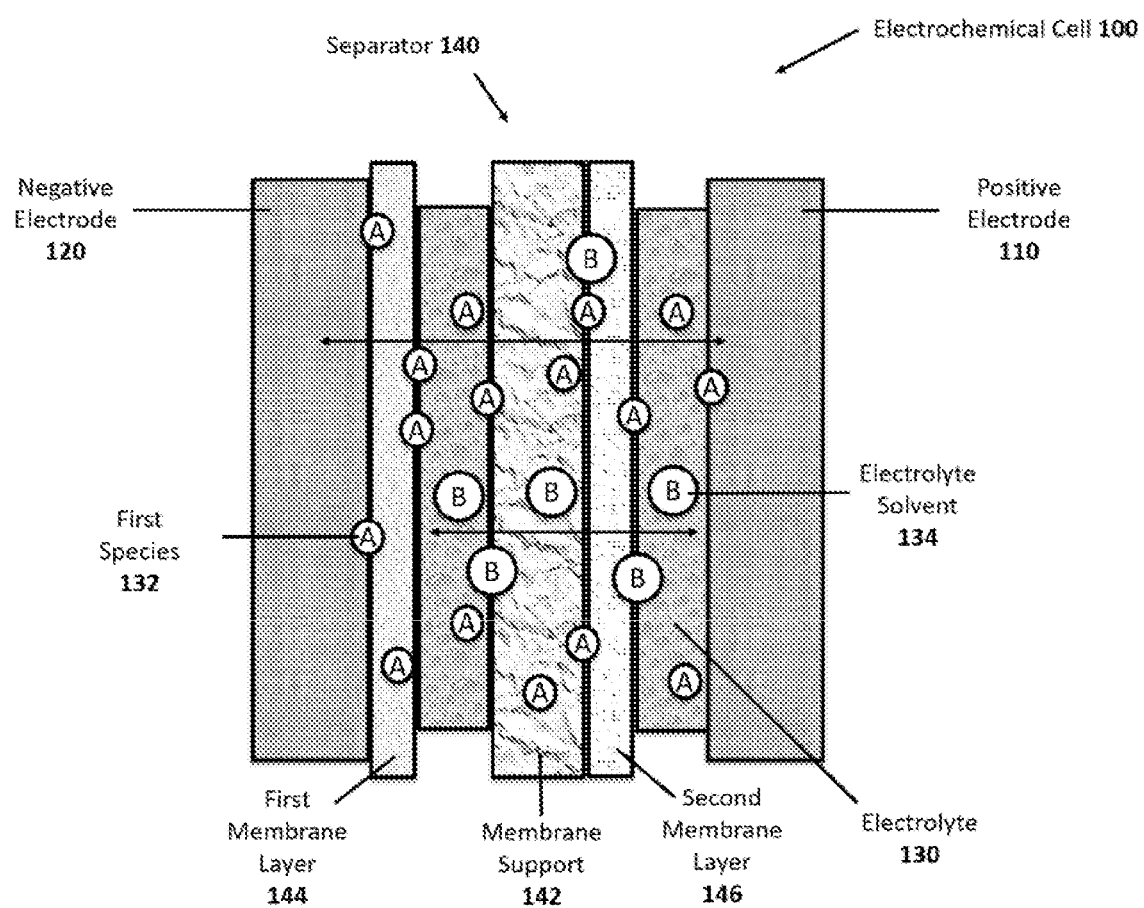
Figure 7:
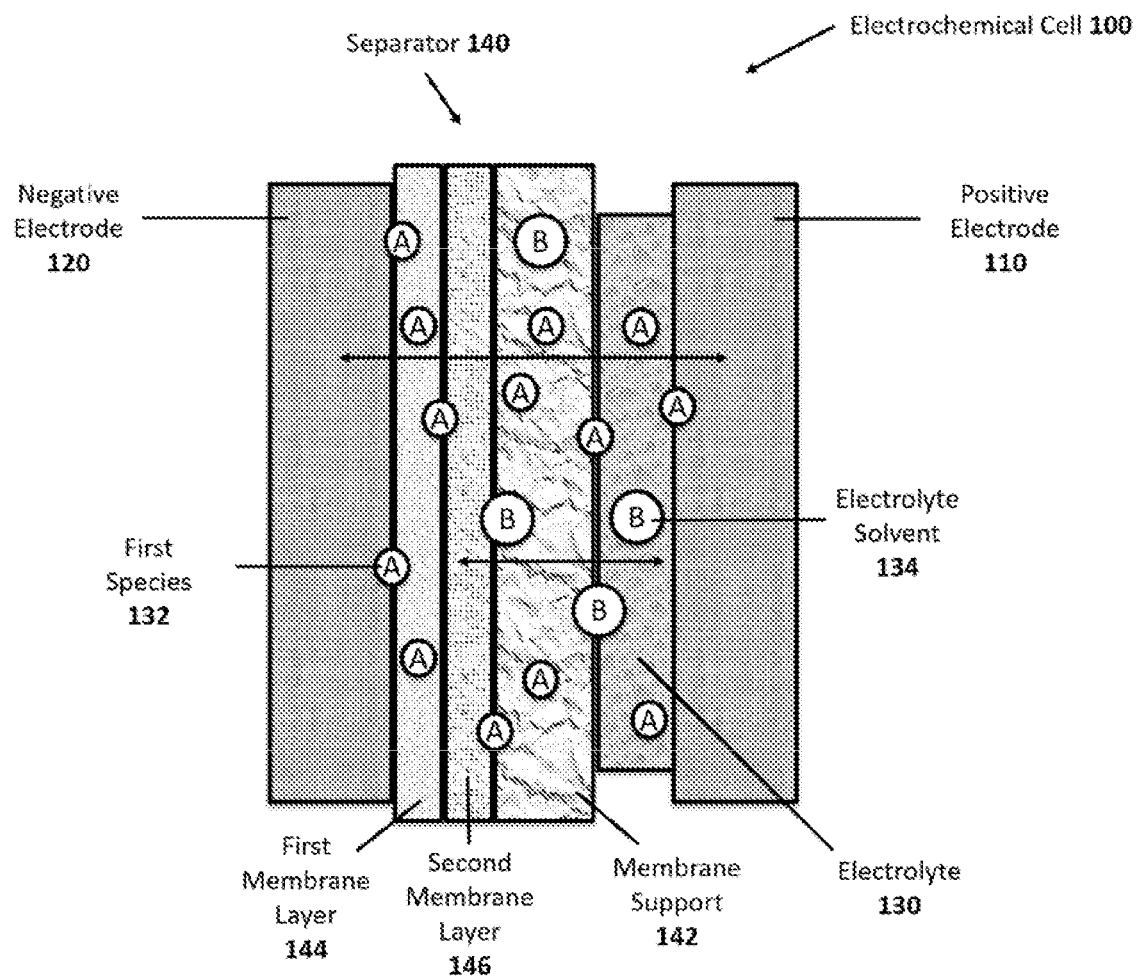

As shown in FIGS. 5-7, first membrane layer 144 may be laminated to membrane support 142, which may be made from a different material and/or have different characteristics than first membrane layer 144. For example, membrane support 142 may be permeable to electrolyte solvent 134 because the pore size of membrane support 142. However, because first membrane layer 144 is substantially impermeable to electrolyte solvent 134, then separator 140 is also impermeable to electrolyte solvent 134.

Membrane Support

In some embodiments, the pore size of membrane support 142 is between about 0.01 micrometers and 5 micrometers or more specifically between about 0.02 micrometers and 0.5 micrometers. The porosity of membrane support 142 may be between about 20% and 85%, or more specifically, between about 30% and 60%. One having ordinary skills in the art would understand that pore sizes may be effected by the composition of electrolyte 130 that is provided in the pores of separator. For example, some components of separator 140 (e.g., membrane support 142 or first membrane layer 144) may swell when come in contact with some materials of electrolyte 130 causing the pore size to change. Unless specifically noted, the pore size and other like parameter refer to components of separator 140 before they come in contact with electrolyte 130.

Larger pore sizes allow using membrane support 142 that is much thicker than first membrane layer 144 without significantly undermining the overall permeability of separator to first species 132. In some embodiments, the thickness of membrane support 142 is between about 5 micrometers and 500 micrometers, or in specific embodiment between about 5 micrometers and 50 micrometers, or more specifically between about 10 micrometers and 30 micrometers. In the same or other embodiments, the thickness of membrane support 142 may be between about 1 to 50 times greater than the thickness of first membrane layer 144 or, more specifically, between about 5 and 25 times greater.

Some examples of suitable materials for membrane support 142 include, but are not limited, fluoro-polymeric fibers of poly(ethylene-co-tetrafluoroethylene (PETFE) and poly(ethylenechloro-co-trifluoroethylene) (e.g., a fabric woven from these used either by itself or laminated with a fluoropolymeric microporous film), polyvinylidene difluoride, polytetrafluoroethylene (PTFE), polystyrenes, polyarylether sulfones, polyvinyl chlorides, polypropylene, polyethylene (including LDPE, LLDPE, HDPE, and ultrahigh molecular weight polyethylene), polyamides, polyimides, polyacrylics, polyacetals, polycarbonates, polyesters, polyetherimides, polyimides, polyketones, polyphenylene ethers, polyphenylene sulfides, polymethylpentene, polysulfones non-woven glass, glass fiber materials, ceramics, metal oxides, composites of organic and inorganic species, and a polypropylene membrane. Membrane support 142 may also be supplied with an additional coating of a second suitable material including, but not limited to, PTFV, PVDF, and PETFE. These examples of membrane support 142 may or may not be commercially available under the designation CELGARD from Celanese Plastic Company, Inc. in Charlotte, N.C., USA, as well as Asahi Kasei Chemical Industry Co. in Tokyo, Japan, Tonen Corporation, in Tokyo, Japan, Ube Industries in Tokyo, Japan, Nitto Denko K.K. in Osaka, Japan. Nippon Kodoshi Corporation, in Kochi, Japan, Entek in Lebanon, Oreg., USA, SK Innovation in Jongro-Gu, Korea, Sumitomo Corporation, in Tokyo, Japan, Toray Industries in Tokyo, Japan, Dupont USA, in Wilmington, Del., USA, and Parker Hannifin Filtration Group, in Carson, Calif., USA.

Membrane support 142 may have various features, such as thermal shutdown, high temperature dimensional stability, and oxidative stability which may not be available from first membrane layer 144.

The membrane support (142) may have a thickness of between about 3 micrometers and 200 micrometers, or between about 5 micrometers and 100 micrometers, or between about 10 micrometers and 50 micrometers, or more specifically between about 15 micrometers and 30 micrometers.

Membrane Layers

Selective blocking characteristics of one or more membrane layers used in a separator come from the composition or specific pore architectures of these layers. For purposes of this disclosure, the term "blocking" is referred to as sieving, selecting, or excluding. In some embodiments, the pore architectures of membrane layer manifest as networks of interconnected pores with small pore sizes, narrow pore-size distribution, high surface area, and high porosity as further described below. In other embodiments, the pore architectures of membrane layer manifest as an array of channels with small pore sizes, narrow pore-size distribution, high surface area, and high porosity as further described below. In addition to these blocking properties, the membrane layer possesses various other properties making them suitable for electrochemical cell applications, such as chemical and electrochemical stability, wettability, thickness, thermal stability, and the like.

The blocking mechanism is based on chemical exclusion (non-wettable) or a size-exclusion effect transpired at a nanometer to sub-nanometer scale where tortuous, ionically percolating, pathways are established in membrane layers. For example, a membrane layer may allow Li-ions (or other like species described below) to pass while blocking larger electrolyte solvent or the like. The membrane may be formed from a ladder polymer with angular spiro centers and absence of rotatable bonds in the polymer backbone or bonds in the backbone with restricted bond rotation. These characteristics provide inefficient solid-state packing with porosity of between about 10% and 40% or, more specifically, between about 20% and 30% of the bulk powder. The pores may then be filled with an inorganic component leaving a non-porous or partially porous membrane layer as is shown in FIG. 8.

The inorganic component may include, but is not limited to alkali metal halides (pure or defect engineered), lithium oxy-nitride, $Li_2S$, $Li_3PS_4$, $Li_7P_3S_{11}$, $Li_{10}GeP_2S_{12}$, $Li_{10}SiP_2S_{12}$, $Li_{10}SnP_2S_{12}Li_xPO_yN_z$ (x=2y+3z−5), $Li_{14}ZnGe_4O_{16}$, $Li_{1.3}Al_{0.3}Ti_{1.7}(PO_4)_3$, $Li_7La_3Zr_2O_{12}$, $Na_{1+x}Zr_2Si_xP_{3-x}O_{12}$ (0<x<3), $Li_2OHCl$, other known alkali metal-ion conductors, etc. or mixtures thereof. The delivery of the inorganic component may be achieved by, but not limited to, solution casting with the polymer, in-polymer-pore transformation of inorganic precursors, vapor deposition, or chemical transformation with the polymer.

Figure 8:
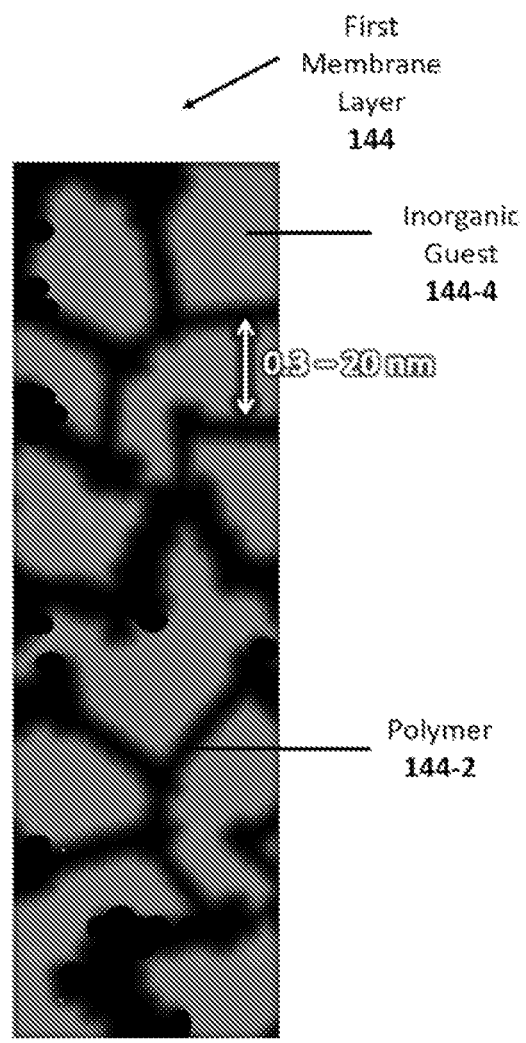
FIG. 8 is a representation of the first membrane layer (144) composed of an inorganic component (144-4) and an organic polymer component (144-2) blended so that that inorganic component (144-4) has a distinct domain size.
Figure 10:
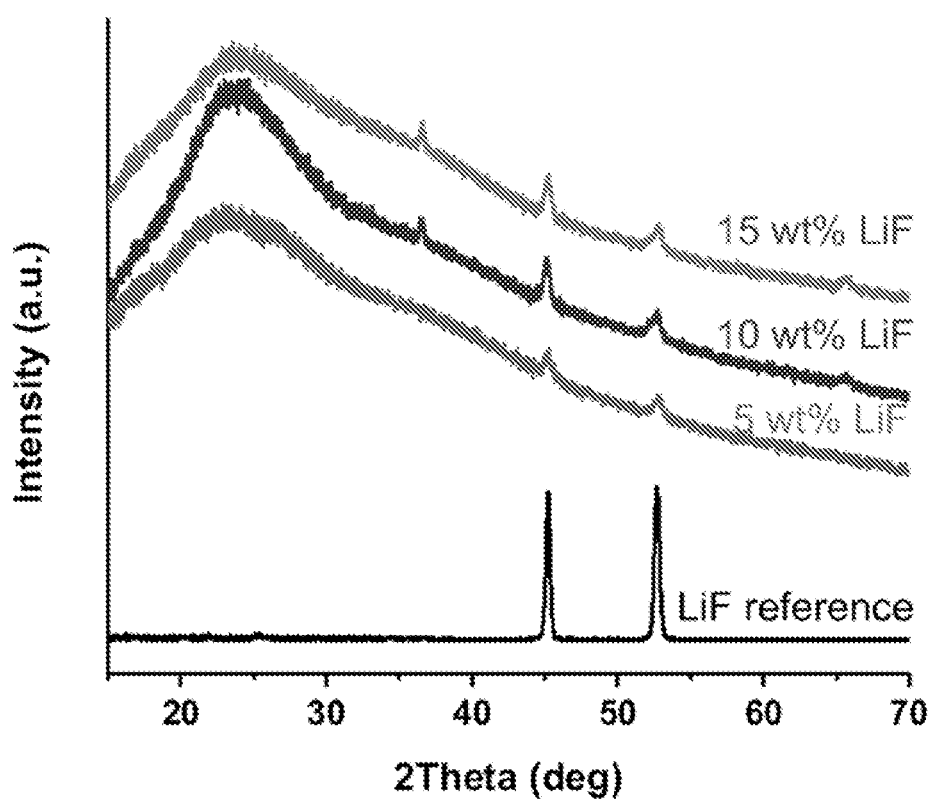
FIG. 10 are a powder X-ray diffraction spectra first membrane layer (144).
Figure 11:
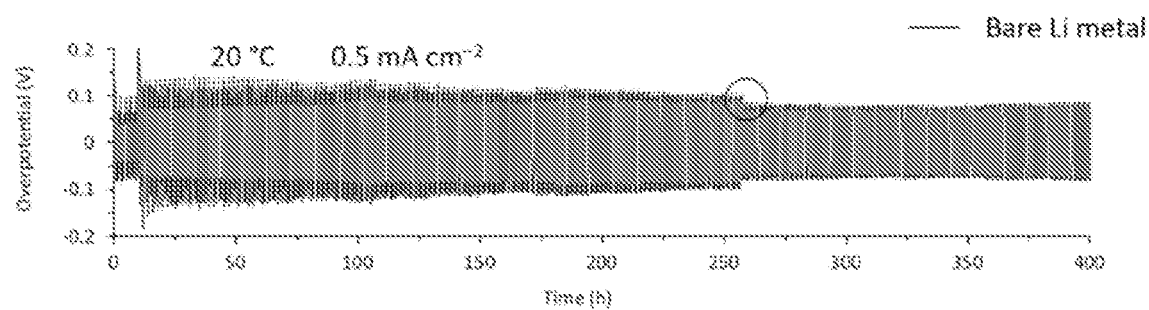
FIG. 11 is galvanostatic cycling of a Li/Li symmetric cell cycling with only membrane support and electrolyte. A soft short is observed just after 250 hours of operation indicated by the circle.
Figure 12:
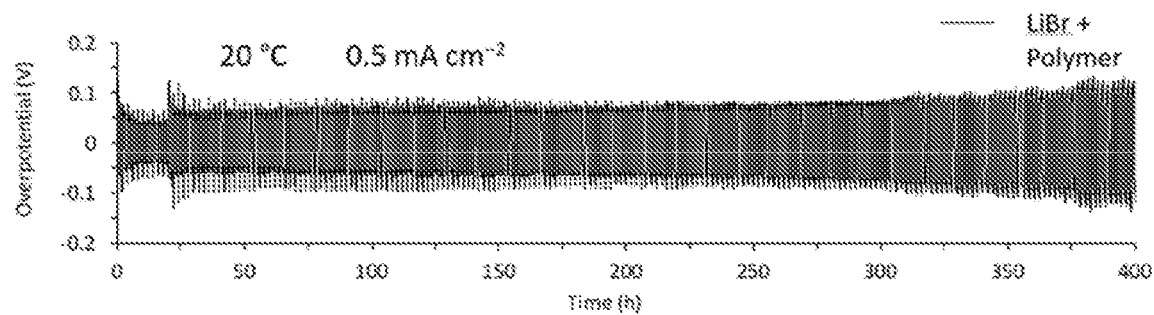
FIG. 12. Is galvanostatic cycling of a Li/Li symmetric cell cycling with first membrane layer—a composite of polymer and LiBr—and membrane support with electrolyte.
Figure 13:
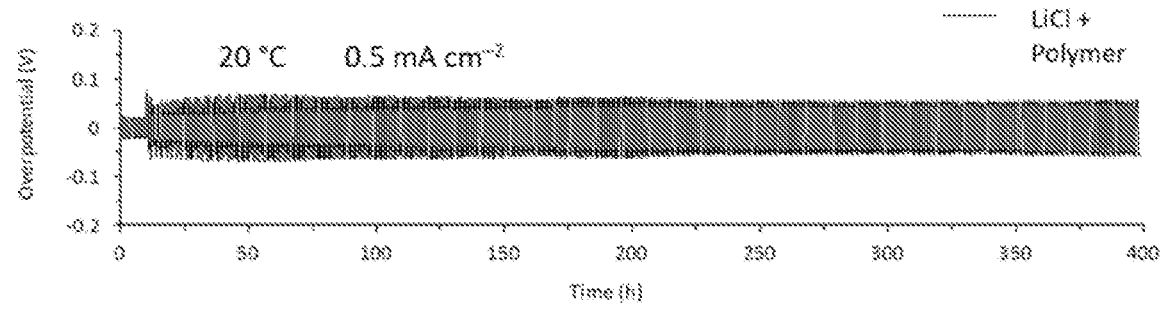
FIG. 13. Is galvanostatic cycling of a Li/Li symmetric cell cycling with first membrane layer—a composite of polymer and LiCl—and membrane support with electrolyte.
Figure 14:
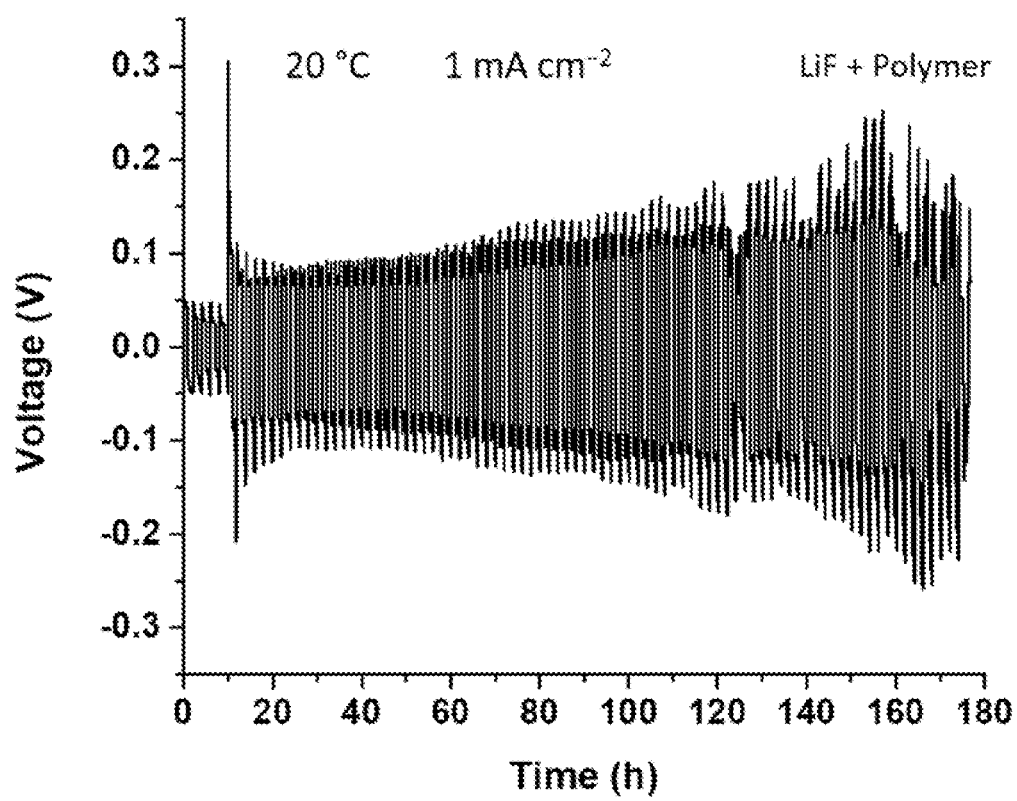
FIG. 14 Is galvanostatic cycling of a Li/Li symmetric cell cycling with first membrane layer—a composite of polymer and LiF—and membrane support with electrolyte.

In some embodiments, the inorganic phase is microstructured, having domains in the 0.5 nm to 2.0 nm range as is represented in FIG. 8. In some embodiments, the inorganic phase is mesostructured, having domains in the 2.0 nm to 50 nm range. In other embodiments a mix of micro and mesostructured inorganic phases are present. These inorganic phases may be crystalline, amorphous, or a mix of both. Some crystallinity was observed by powder X-ray diffraction and is shown in FIG. 10.

To achieve very high volume fractions of microstructured inorganic components, high free volume and microporosity are sought after. Polymers presenting these properties are so-called high free volume polymers. These highly permeable polymers have been applied mostly to gas separations. Some examples include certain substituted polyacetylenes (e.g. PTMSP), some perfluoropolymers (e.g. Teflon AF), certain poly(norbornene)s, polymers of intrinsic microporosity, and some polyimides. Their microporosity has been demonstrated by molecular modelling and positron lifetime spectroscopy (PALS). Highly permeable polyacetylenes have bulky side groups that inhibit conformational change and force the backbone into a twisted shape. These rigid polymer macromolecules cannot pack properly in the solid state, resulting in high free volume. The free volume distribution comprises disconnected elements as in glassy polymers and continuous microvoids. In Teflon perfluoropolymers their high free volume is due to a high barrier to rotation between neighbouring dioxolane rings, coupled with weak interchain interactions, which are well known for fluoropolymers, leading to low packing density and hence high permeability. In the case of poly(norborene)s and PTMSP, the presence of bulky trimethylsilyl groups on the ring greatly restricts the freedom of the polymer to undergo conformational change. In polymers of intrinsic microporosity (PIMs), molecular linkers containing points of contortion are held in non-coplanar orientation by rigid molecules, which do not allow the resulting polymers to pack closely and ensure high microporosity. The PIMs concept has been reported for polymides [P M Budd and N B McKewon, "Highly permeable polymers for gas separation membranes, Polymer Chemistry, 1, 63-68, 2010].

There are two different types of PIMs, i) non-network (linear) polymers which may be soluble in organic solvents, and ii) network polymers which are generally insoluble, depending on the monomer choice. PIMs possess internal molecular free volume (IMFV), which is a measure of concavity and is defined by Swager as the difference in volume of the concave unit as compared to the non-concave shape [T M Long and T M Swager, "Minimization of Free Volume: Alignment of Triptycenes in Liquid Crystals and Stretched Polymers", Adv. Mater, 13, 8, 601-604, 2001]. While the intrinsic microporosity in linear PIMs is claimed to derive from the impenetrable concavities given by their contorted structures, in network PIMs, microporosity is also claimed to derive from the concavities associated with macrocycles. In non-network PIMs, rotation of single bonds has to be avoided, whereas the branching and crosslinking in network PIMs is thought to avoid structural rearrangement that may result in the loss of microporosity (McKeown, 2010), so that single bonds can be present without loss of microporosity. In general, it has been observed that network PIMs possess greater microporosity than non-network PIMs due to their macrocyclization [N B McKewon, P M Budd, "Explotation of Intrinsic Microporosity in Polymer-Based materials", Macromolecules, 43, 5163-5176, 2010]. However, since prior art network PIMs are not soluble, they can only be incorporated into a membrane if mixed as fillers with microporous soluble materials, which include soluble PIMs or other soluble polymers. There is a strict requirement in non-network PIMs that there are no single bonds in the polymer backbone, to prevent rotational freedom and so provide intrinsic microporosity. Highly rigid and contorted molecular structures are required, providing awkward macromolecular shapes that cannot pack efficiently in space. Molecules with awkward shapes are those that pose packing problems due to their concavities. However, in order to have microporosity in non-network PIMs, concave shape molecules are not sufficient as the voids must be sufficiently interconnected for transport to occur with minimal energy (i.e. intrinsic microporosity) [N B McKewon, P M Budd, "Explotation of Intrinsic Microporosity in Polymer-Based materials", Macromolecules, 43, 5163-5176, 2010]. Non-network PIMs may be soluble, and so suitable for casting a membrane by phase inversion, or for use coating a support membrane to make a thin film composite. However, their solubility in a range of solvents restricts their applications in organic solvent nanofiltration [Ulbricht M, Advanced functional polymer membranes. Single Chain Polymers, 47, 2217-2262, 2006].

U.S. Pat. No. 7,690,514 B2 describes materials of intrinsic microporosity comprising organic macromolecules comprised of a first generally planar species connected by linkers having a point of contortion such that two adjacent first planar species connected by a linker are held in non-coplanar orientation. Preferred points of contortion are Spiro groups, bridged ring moieties and sterically congested bonds around which there is restricted rotation. These non-network PIMs may be soluble in common organic solvents, allowing them to be cast into membranes, or coated onto other support membranes to make a thin film composite.

PIM-1 (soluble PIM) membranes exhibit gas permeabilities which are exceeded only by very high free volume polymers such as Teflon AF2400 and PTMSP, presenting selectivities above Robeson's 1991 upper bound for gas pairs such as $CO_2/CH_4$ and $O_2/N_2$. Studies have shown that permeability is enhanced by methanol treatment, helping flush out residual casting solvent and allowing relaxation of the chains [P M Budd and N B McKewon, D Fritsch, "Polymers of Intrinsic Microporosity (PIMs): High free volume polymers for membrane applications", Macromol Symp, 245-246, 403-405, 2006].

A range of polyimides with characteristics similar to a microporous polymer (PIM) were prepared by Ghanem et al. and membrane gas permeation experiments showed these PIM-Polyimides to be among the most permeable of all polyimides and to have selectivities close to the upper bound for several important gas pairs [B G Ghanem, N B McKeown, P M Budd, N M D Fritsch, K Heinrich, L Starannikova, A Tokarev and Y Yampolskii, "Synthesis, characterization, and gas permeation properties of a novel group of polymers with intrinsic micro porosity: PIM-polyimides", Macromolecules, 42, 7781-7888, 2009].

U.S. Pat. No. 7,410,525 B1, describes polymer/polymer mixed matrix membranes incorporating soluble polymers of intrinsic microporosity as microporous fillers for use in gas separation applications.

International Patent Publication No. WO 2005/113121 (PCT/GB2005/002028) describes the formation of thin film composite membranes from PIMs by coating a solution of PIMs in organic solvent onto a support membrane, and then optionally crosslinking this PIM film to enhance its stability in organic solvents.

In order to improve the stability of soluble-PIMs membranes U.S. Pat. No. 7,758,751 B1, describes high performance UV-crosslinked membranes from polymers of intrinsic microporosity (PIMs) and their use in both gas separations, and liquid separations involving organic solvents such as olefin/paraffin, deep desulfurization of gasoline and diesel fuels, and ethanol/water separations.

In some embodiments, a membrane layer comprises a polymer having a chain comprised of repeating units bonded to each other. Each unit may include a first generally planar species comprising at least one aromatic ring and also comprising a rigid linker having a site of contortion, which is a Spiro group, a bridged ring moiety, or a sterically congested single covalent bond. The rigid linker restricts rotation of the first planar species in a non-coplanar orientation. In some embodiments, at least 50% by mole (or 70%, 80%, or even 90%) of the first planar species in the chain are connected by the rigid linkers to a maximum of two other planar species and being such that it does not have a cross-linked, covalently bonded 3-dimensional structure. As such, this polymer may include rigid linkers having a site of contortion. Since these polymer chains do not pack together by virtue of their rigid contorted structure, the membrane layer possesses intrinsic microporosity and, in some cases, nanoporosity. As such, this combination of non-packed and non-crosslinked polymer chains extends in three dimensions. It may be also considered as a non-network polymer. Cross-linked polymers are also within the scope.

In some embodiments, the membrane layer comprises a thermally-rearranged polymer, which is processed at an elevated temperature from a precursor polymeric material with a low fraction of free volume elements to a thermally-rearranged polymeric material with a higher fraction of free volume elements. This transformation often proceeds by a restructuring of the covalent bonds in the precursor polymer material at the higher temperature, which significantly changes the initial polymer chain conformation and the initial polymer packing in the solid state. Such thermally rearranged polymers may feature pore sizes in the range of approximately 3 Angstroms to 5 nanometers. In some instances, a crosslinker can be used to create voids between polymer chains.

In some embodiments, the membrane layer comprises a carbon molecular sieve, which is generated from a structurally rigid and microporous polymer host (e.g., polyimide, Matrimid, poly(furfuryl alcohol), phenol-based resins, or poly(vinyl chloride) copolymers) upon pyrolysis.

In some embodiments, the membrane layer comprises an array of organic nanotubes, which can be assembled from molecular subunits (e.g., linear peptides, cyclic peptides, dendrimers, helical polymers, and guanidine quadruplexes) with pore sizes of approximately 3 Angstroms to 3 nm. In some instances, organic nanotubes benefit from exterior functionalization to align the nanotubes within a matrix (e.g., a mesostructured block copolymer film). This allows for facile processing of the membrane layer using solution processing and where a plurality of the organic nanotubes is aligned within the film such that they feature pore apertures on both sides of the membrane layer.

In some embodiments, the membrane layer comprises a zeolite, which is a class of microporous aluminosilicate, silicalite, metallosilicates, or metallophosphate framework solids. Zeolites can be prepared with uniform pore sizes ranging from approximately 3 Å to 1 nm. Their application as a membrane layer could take the form of a solid dispersion in a host material such as a polymer, as a film of exfoliated 2-dimensional layers one or several atoms thick but no more than the number of atoms in a single unit cell, or composite thereof with a polymer.

In some embodiments, the membrane layer comprises a Metal-Organic Framework, or MOF. MOFs are sometimes referred to as porous coordination polymers, but will be referred to here as MOFs. MOFs feature at least two types of building blocks, known as secondary building units—metal-containing secondary building units and organic secondary building units—which are organized periodically in space into a crystalline, porous hybrid organic-inorganic solid with pore dimensions of approximately 3 Å to 10 nm. The metal-containing secondary building units can comprise either a metal ion or a cluster of atoms containing multiple metals and other atoms. Metal-containing secondary building units serve as nodes that are linked together by polytopic organic secondary building units. MOFs amenable to post-synthetic modifications to further enhance the selectivity or permeability of the membrane layer. Their application as a membrane layer could take the form of a solid dispersion in a host material such as a polymer, as a MOF film, or as a film of exfoliated 2-dimensional layers one or several atoms thick but no more than the number of atoms in a single unit cell, or composite thereof with a polymer.

In some embodiments, the membrane layer comprises a Covalent Organic Framework (COF). Their application as a membrane layer could take the form of a solid dispersion in a host material such as a polymer, as a COF film, or as a film of exfoliated 2-dimensional sheets or composite thereof with a polymer.

This approach allows incorporation of various other components to provide different functionality (e.g., basic sites and sites for metal chelation). This type of a polymer has a high surface area (e.g., at least about 300 $m^2$ $g^{-1}$) and also sufficiently soluble in various organic solvents.

In some embodiments, the surface area of the membrane layer (as measured by nitrogen adsorption or a related technique of the dry powder prior to membrane processing) prior to infilling with an inorganic component may be at least 200 $m^2/g$ or at least 500 $m^2/g$ such as between 200 $m^2/g$ and 2200 $m^2/g$ or more specifically between 600 $m^2/g$ and 900 $m^2/g$. Representative methods for measuring surface area include nitrogen adsorption BET. The surface area is directly related to the porosity, essential for efficient transport of supporting electrolyte between electrodes and higher power cell operation. Typical porosities range from 20% to 70% or more specifically 30% to 60%. The surface area of the membrane layers of the present invention can be from 100 $m^2/g$ to 3000 $m^2/g$, such as 100 $m^2/g$, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, or 3000 $m^2/g$. In some embodiments, the first membrane layer has a surface area of from 100 $m^2/g$ to 3000 $m^2/g$, as measured by nitrogen adsorption BET.

In some embodiments, the average pore diameter of the membrane layer prior to infilling with an inorganic component is of less than 100 nm, or from about 0.1 nm to about 20 nm, or from about 0.1 nm to about 10 nm, or from about 0.1 nm to about 5 nm, or from about 0.1 nm to about 2 nm, or from about 0.1 nm to about 1 nm. For example, the average pore diameter of the membrane layer can be less than about 10 nm, or less than about 9, 8, 7, 6, 5, 4, 3, 2, or 1 nm. For example, the average pore diameter of the membrane layer can be about 10 nm, or about 9, 8, 7, 6, 5, 4, 3, 2, or 1 nm. This pore diameter ensures that some materials (e.g., materials that have unit sizes greater than the pore diameter) are blocked by the membrane layer, while other materials are allowed to pass (e.g., materials with smaller unit sizes). In some embodiments, the first membrane layer has an average pore diameter of from 0.1 nm to 10 nm. In some embodiments, the first membrane layer has an average pore diameter of from 0.1 nm to 2 nm. In some embodiments, the first membrane layer has an average pore diameter of from 0.1 nm to 1 nm.

In some embodiments, the number average mass of the membrane layer is between $1 \times 10^3$ and $1000 \times 10^3$ amu or, more specifically, between $15 \times 10^3$ and $500 \times 10^3$ amu or even between $20 \times 10^3$ and $200 \times 10^3$. Larger number average mass polymers contribute to enhanced mechanical properties of the formed membrane.

The membrane layer may be in the form of a pressed powder, a collection of fibers, a compressed pellet, a film cast, sprayed or coated from solution (e.g., onto the membrane support), a composite comprised of a plurality of individual membrane layers, a free-standing film, or a supported film (e.g., by a membrane support).

In some embodiments, the membrane layer (element 144 in the above description) has a thickness of between about 5 nanometers and 20 micrometers, or between about 100 nanometers and 10 micrometers, or more specifically between about 500 nanometers and 5 micrometers.

In some embodiments, the first membrane layer includes a microporous polymer.

As described above, the membrane layer may comprise a polymer having chains, each comprising repeating units bonded to each other. Each unit in the chain may include a first generally planar species comprising at least one aromatic ring and also comprising a rigid linker having a site of contortion, which is a spiro group, a bridged ring moiety, or a sterically congested single covalent bond.

Each of the first planar species may comprise at least one aromatic ring. More specifically, the first planar species comprises a substituted or unsubstituted moiety of one of the following formula, where R and R' may be any combination of alkly, aryl, olefin, alkyl ether, aryl ether, fluorinated alkyl, fluorinated aryl, fluorinated alkyl ether, Y, Y' may be any combination of alkyl, O, S, SO, $SO_2$, NH, N-alkyl, N-aryl, N-fluoro alkyl, and N-fluoro aryl.

Formula 1

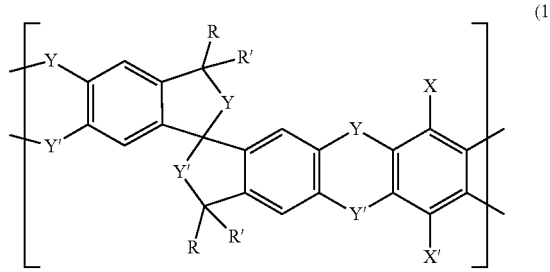

(1)

A specific example of a polymer for membrane layers is shown below, which has rigid and contorted molecular structure as shown in the following formula.

Formula 2

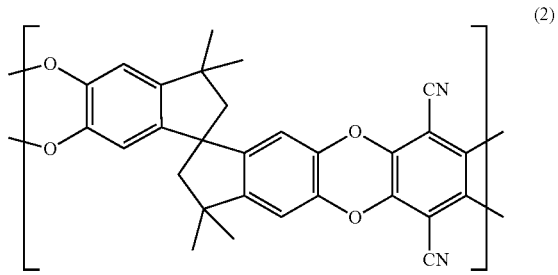

(2)

In some embodiments, the first membrane layer includes the polymer having the following structure:

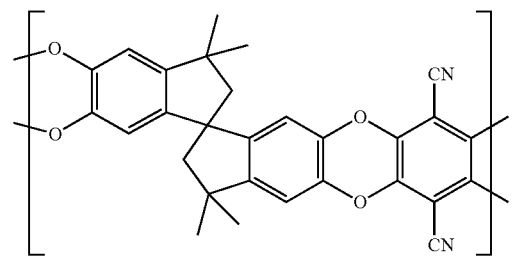

The microporosity of a membrane layer represented by Formula 2 is demonstrated by its high surface area (approximately 680-850 $m^2/g$) determined using nitrogen adsorption measurements (BET calculation). The presence of the cyano and methyl groups is optional, they may be omitted or replaced with other simple substituents. Each phenyl group may contain one or more substituents. Additionally, the nature and arrangement of substituents on the spiro-indane moiety may be chosen to provide any desirable configuration around the carbon atom common to both 5-membered rings.

A membrane layer represented by Formula 2 is freely soluble in THF and chloroform, partially soluble in DMF and insoluble in acetone, methanol, water, and organic carbonates. In solution, as a powder and as a solvent cast membrane it is highly fluorescent (yellow). Most importantly, it displays a surface area in the range 680-850 $m^2/g$. Simple molecular modelling shows that the membrane layer represented by Formula 2 is forced to adopt a contorted configuration due to the presence of the spiro-indane centers, each of which acts as a "site of contortion". In addition, the fused ring structure ensures that the randomly contorted structure of each polymer molecule is locked so that the molecules cannot pack efficiently resulting in microporosity.

Examples of the polymer membrane layer may be prepared in good yield from the aromatic nucleophilic substitution reaction between (3) and (4) as shown below in reaction scheme A:

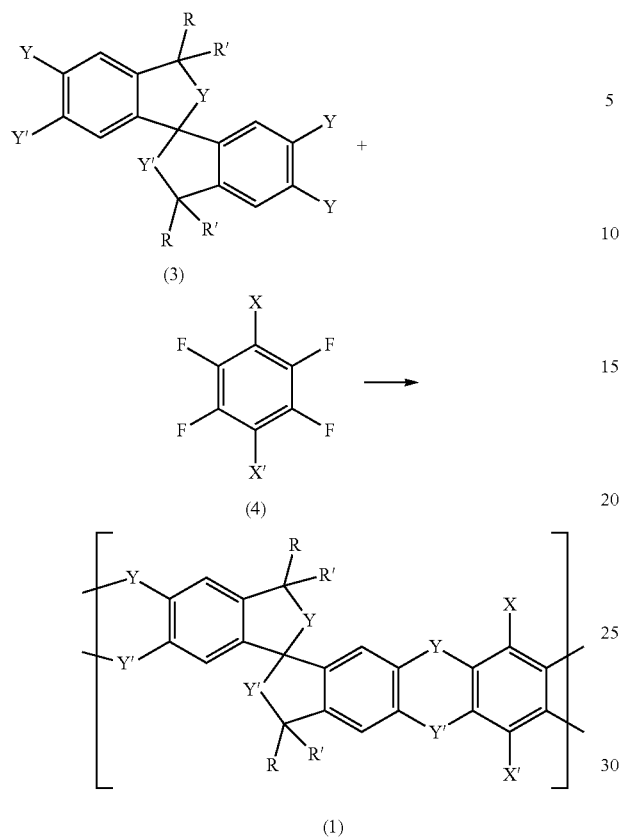

(3)

(4)

(1)

Without being restricted to any particular theory, it is believed the five and six-membered ring structure has a robust chemical nature.

Combinations of porous or non-porous polymers with common porous or non-porous materials may also serve as a membrane layer, including but not limited to combinations of fluoro-polymeric fibers of poly(ethylene-co-tetrafluoroethylene (PETFE) and poly(ethylenechloro-co-trifluoroethylene) (e.g., a fabric woven from these used either by itself or laminated with a fluoropolymeric microporous film), polystyrenes, polyarylether sulfones, polyvinyl chlorides polypropylene, polyethylene (including LDPE, LLDPE, HDPE, and ultra high molecular weight polyethylene), polyamides, polyimides, polyacrylics, polyacetals, polycarbonates, polyesters, polyetherimides, polyimides, polyketones, polyphenylene ethers, polyphenylene sulfides, polymethylpentene, polysulfones non-woven glass, glass fiber materials, ceramics, metal oxides, MOFs, zeolites, porous carbons, composites of organic and inorganic species, and a polypropylene membrane.

The membrane layers may be cross-linked using a suitable cross-linking agent. Such cross-linking may render the membrane partially or completely insoluble in organic solvents, which may be desirable in certain applications.

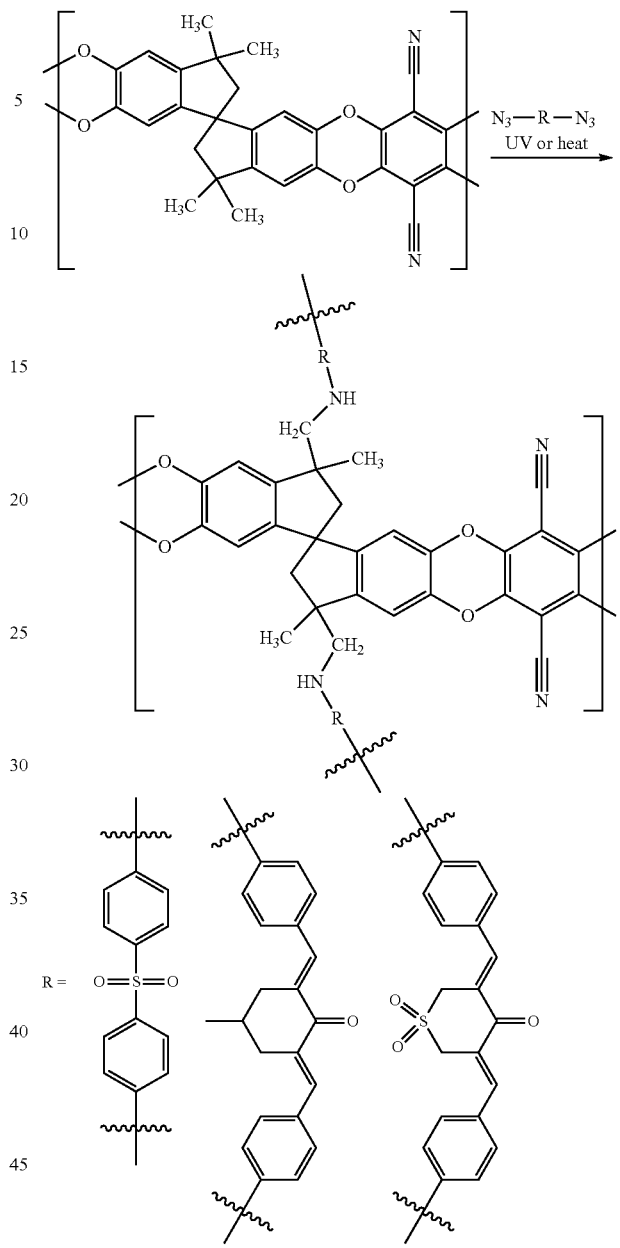

In one aspect, the membrane layer can include at least one of an aliphatic or aromatic polyamide, aromatic polyhydrazide, poly-benzimidazolone, polyepiamine/amide, polyepiamine/urea, poly-ethyleneimine/urea, sulfonated polyfurane, polyether, a polyether-amide, a polyether-urea, a polyester, a polyester-amide, polybenzimidazole, polypiperazine isophtalamide, or a polyimide or a copolymer thereof or a mixture thereof. The polymer selected to form the membrane layer can be formed by an interfacial polymerization reaction.

In some embodiments, the monomers used to form the membrane layer can include a molecule with a concave shape (i.e. concavity), preferably rigid and linked to another monomer or monomers to form a polymer network within which molecular rotation is preferably hindered. Concavity-containing monomers include but are not limited to molecules containing a spiro-contorted centre, bridged ring moieties and sterically congested single covalent bonds around which there is restricted rotation. These molecules are also known as molecules with awkward shapes (i.e. those that pose packing problems due to their concavities). Structural units with well-defined cavities include but are not limited to 1,1-spirobisindanes, 9,9-spirobisfluorenes, bisnaphthalenes, 1,1-spirobis,2,3,4-tetrahydro-naphthalenes, and 9,10-ethanoanthracene. Generally, the membrane layers can be prepared by reaction of two or more monomers, wherein at least one of the monomers possesses concavity. In one aspect the first monomer is a dinucleophilic or polynucleophilic monomer and the second monomer is a dielectrophilic or a polyelectrophilic monomer. Wherein, each monomer can have two or more reactive groups. Both electrophiles and nucleophiles are well known in the art, and one of skill in the art can choose suitable monomers for the interfacial polymerisation reaction. The first and second monomers can be chosen so as to be able to undergo an interfacial polymerisation reaction to form a three-dimensional polymer network when brought into contact.

The monomers and polymers for making polymers of intrinsic microporosity useful in the present invention are known to one of skill in the art. For example, representative monomers and polymers can be found in U.S. Publication No. 2014/0251897; Sci. China Chem 2017, 60(8), 1023; Nature Materials 2017, 16, 932; Adv. Energy Matr. 2016, 1600517.

The polymers of intrinsic microporosity that can be used in the present invention can be prepared by a variety of methods, including interfacial polymerization (Nature Materials 2016, 15, 760-767).

In a further embodiment of this invention, the membrane layer can include a network comprised of but not limited to, a polyester, a polyether, a polyamide, a polyimide or a mixture thereof. The polyester, polyamide, polyether or polyimide can be aromatic or non-aromatic. For example, the polyester can comprise residues of a phthaloyl (e.g. terephthaloyl or isophthaloyl) halide, a trimesoyl halide, or a mixture thereof. In another example, the polyester can comprise residues of a polyphenol containing a spiro-contorted centre, or bridged ring moieties or sterically congested single covalent bonds around which there is restricted rotation, or a mixture thereof. Wherein, a concave monomer may include but is not limited to small oligomers (n=0-10) of a polymer with intrinsic microporosity (PIM) containing nucleophilic or electrophilic reactive groups. One of skill in the art can choose suitable PIMs oligomers with reactive groups able to undergo an interfacial polymerisation reaction, which include but are not limited to polyphenols or polyamines. In a further embodiment, the layer comprises residues of a trimesoyl halide and residues of a tetraphenol with a spiro-contorted centre. In a further embodiment, the film comprises residues of trimesoyl chloride and 5,5',6,6'-Tetrahydroxy-3,3,3',3'-tetramethyl-1,1'-spirobisindane. In a further aspect, the film comprises the reaction product of trimesoyl chloride and the sodium salt of 5,5',6,6'-Tetrahydroxy-3,3,3',3'-tetramethyl-1,1'-spirobisindane (TTSBI).

In some embodiments, separator 140 may include second membrane layer 146. The position of second membrane layer 146 may be such that membrane support 142 is disposed between first membrane layer 144 and second membrane layer 146 as, for example, is shown in FIG. 5 and FIG. 6. Alternatively, first membrane layer 144 and second membrane layer 146 may be disposed on the same side of membrane support 142 as, for example, schematically shown in FIG. 7. Furthermore, first membrane layer 144 and second membrane layer 146 may be used without membrane support 142 as noted above. For example, both first membrane layer 144 and second membrane layer 146 may be formed on one of the electrodes or first membrane layer 144 may be formed on one electrode while second membrane layer 146 may be formed on a different electrode.

First membrane layer 144 and second membrane layer 146 may have the same composition, same porosity (pore size and porosity), and/or the same thickness. These embodiments may be referred to as a mirrored membrane layer arrangement (regardless of first membrane layer 144 and second membrane layer 146 being positioned on the same side of membrane support 142 or different sides of membrane support 142 or used without membrane support 142 as noted above). Alternatively, one or more characteristics of first membrane layer 144 and second membrane layer 146 may be different. For example, second membrane layer 146 may include a polymer different from that of first membrane layer 144 or a ceramic coating blended with a polymer binder. In some embodiments, second membrane layer 146 is a ceramic separator coating. Some examples of ceramic materials that can be used in second membrane layer 146 include, but are not limited to, aluminum oxide, silicon oxide, silicon carbide, titanium dioxide, magnesium oxide, tin oxide, cerium oxide, zirconium oxide, barium titanite, yttrium oxide, boron nitride, ion conducting ceramic (e.g., (Li,La)TiO$_3$, Li—La—Zr—O, sulfide based electrolytes), and combinations thereof. These ceramic materials may be present in the form of particles, flakes, and/or rods and may be supported by a base matrix material such as a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof.

Second membrane layer 146 may have various features, but not limited to, thermal shutdown, high temperature dimensional stability, and oxidative stability which may not be available from first membrane layer 144.

Figure 4:
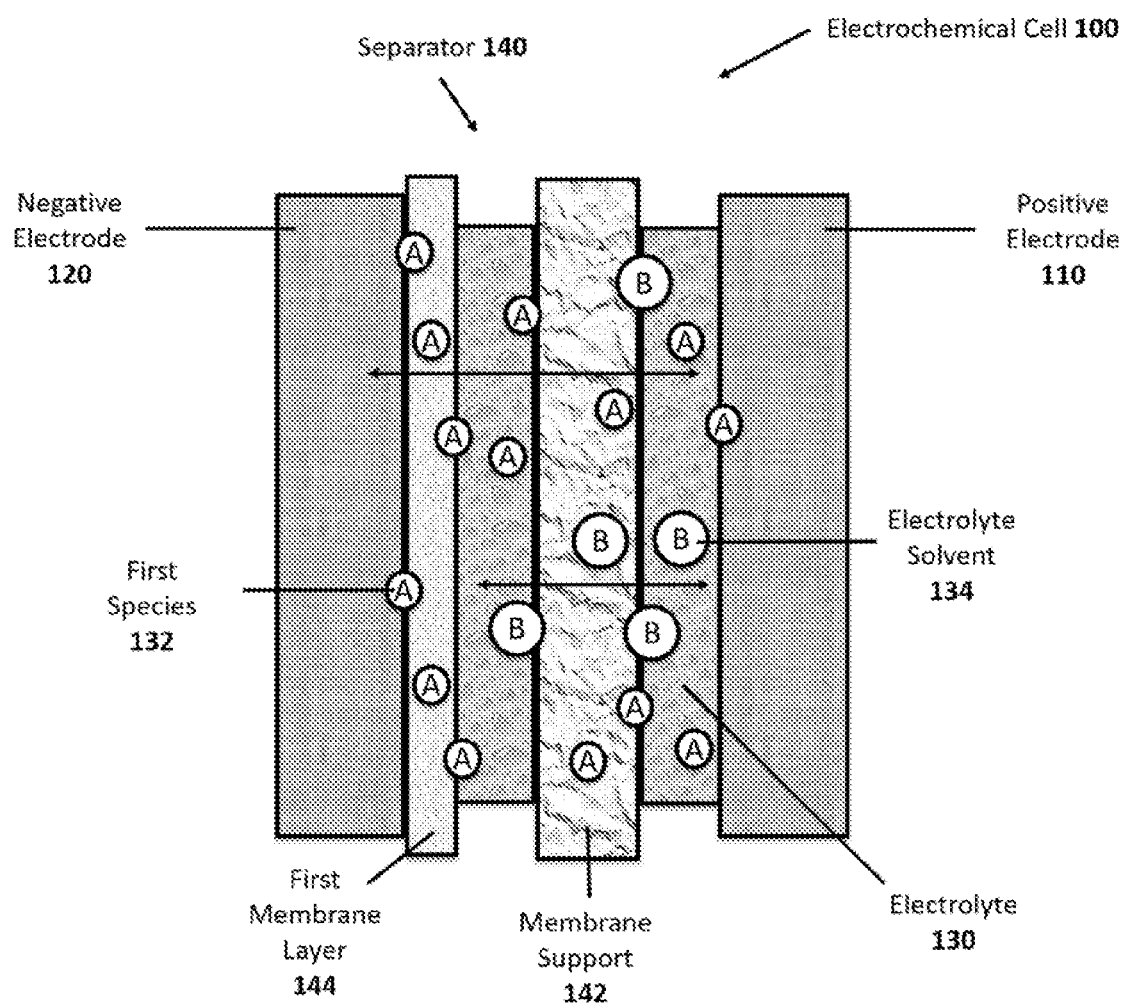

First membrane layer 144 and/or second membrane layer 146, if present, may be laminated to membrane support 142. Alternatively, first membrane layer 144 and/or second membrane layer 146, if present, may be laminated to or coated on to the electrodes as, for example, schematically shown in FIG. 4 and FIG. 6. One having ordinary skills in the art would understand that in some embodiments, e.g., electrochemical energy storage cells, membrane support 142 may be in direct physical contact with first membrane layer 144 (in the final electrochemical cell) even though first membrane layer 144 may be formed on the electrode (e.g., negative electrode 120). Specifically, if membrane support 142 is present, it may come in contact with first membrane layer 144 and second membrane layer 146, if present, when assembling (e.g., stacking or winding) electrochemical cell 100.

Figure 3:
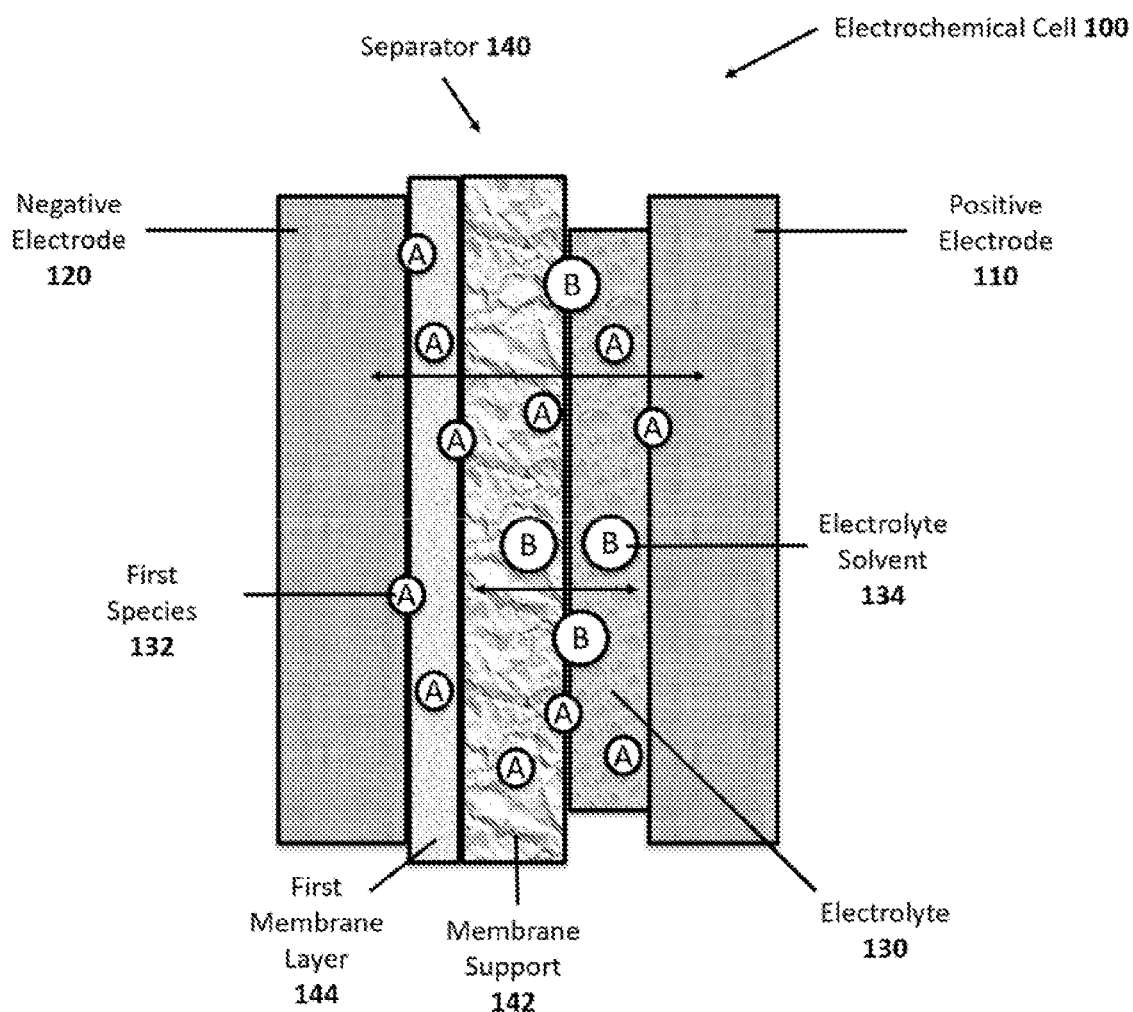

In some embodiments, separator 140 may include only one membrane layer, i.e., first membrane layer 144. In these embodiments, separator 140 may still include membrane support 142 as, for example, is shown in FIG. 3. First membrane layer 144 may be positioned between membrane support 142 and one of positive electrode 110 or negative electrode 120 or, more specifically, between membrane support 142 and negative electrode 120.

Figure 2:
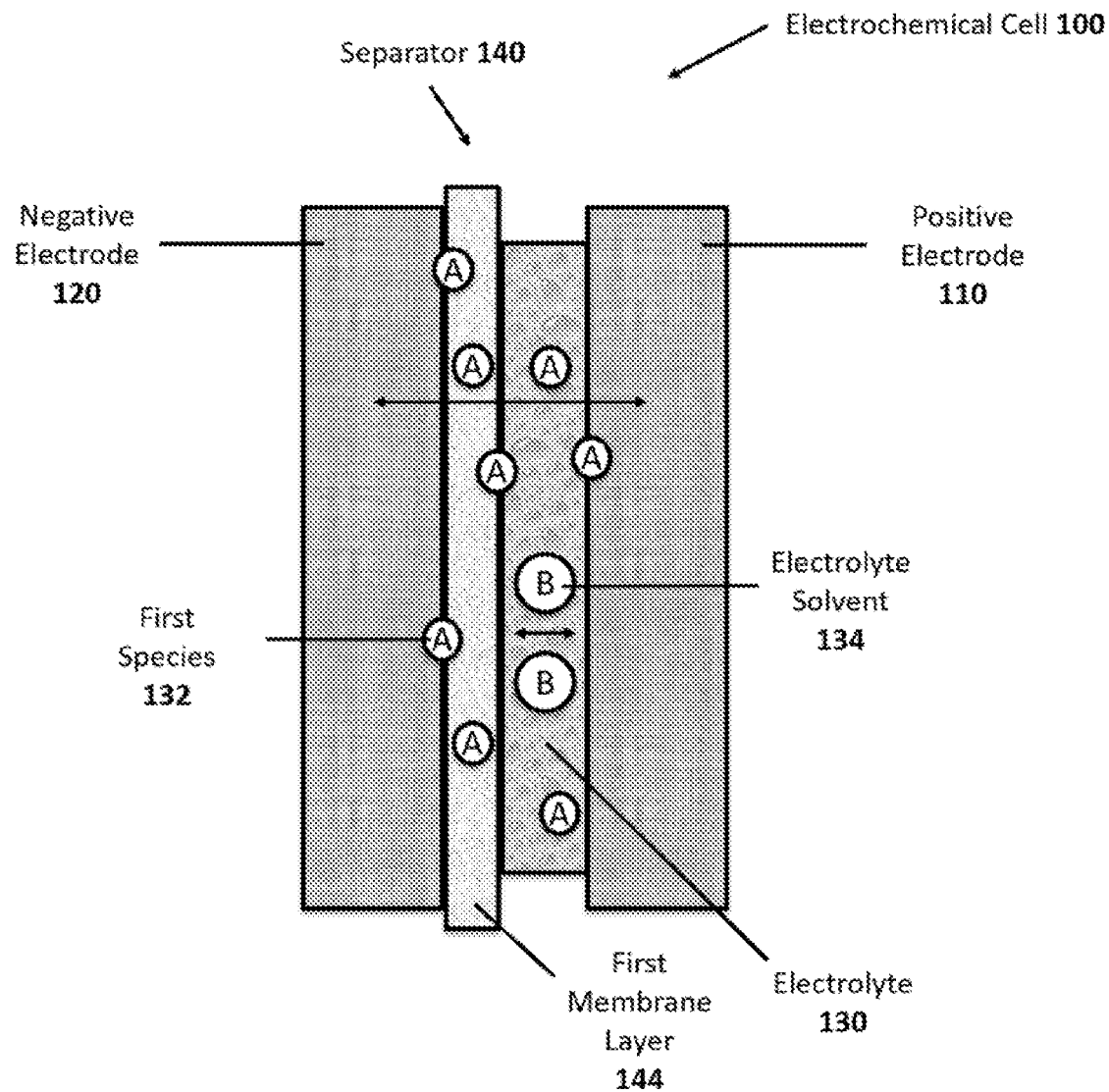

Alternatively, first membrane layer 144 may be used without membrane support 142 as, for example, shown in FIG. 1 and FIG. 2. In these examples, the support to first membrane layer 144 may be provided by positive electrode 110 or negative electrode 120. For example, first membrane layer 144 may be formed on positive electrode 110 or negative electrode 120 (e.g., coated right on the electrode). Alternatively, membrane layer 144 may be self-supportive.

Figure 9:
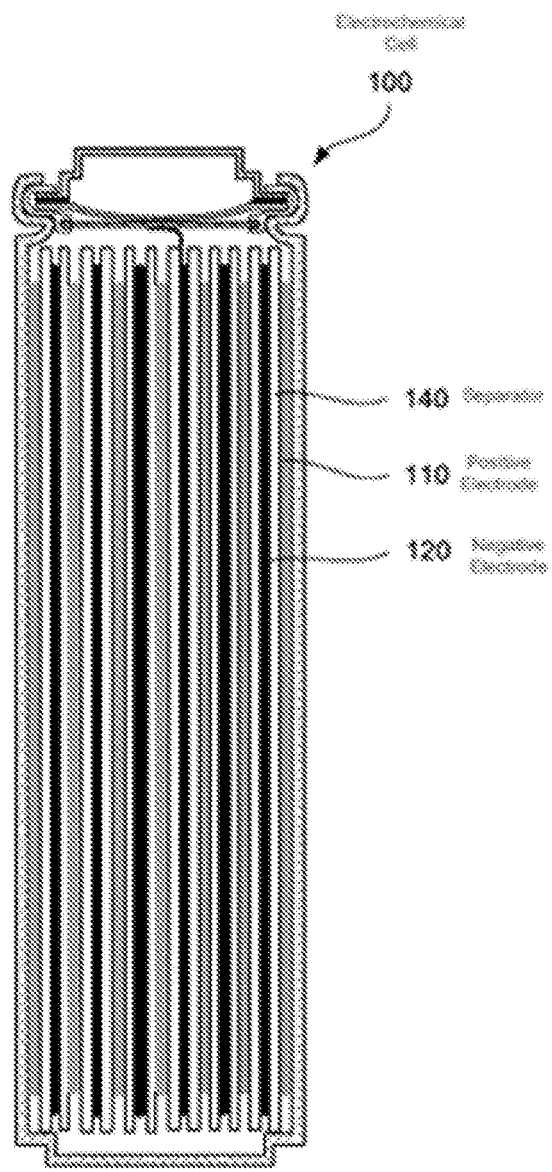
FIG. 9 describes an embodiment of an electrochemical cell showing multiple layers of the positive electrode (110), negative electrode (120) and the separator (140).

FIG. 9 illustrate an example of electrochemical cell 100 in which positive electrode 110, negative electrode 120, and separator 140 may be arranged into a repetitive structure. This type of electrode arrangement may be used for energy storage devices. Separator 140 is positioned between each adjacent pair of positive electrode 110 and negative electrode 120. For example, multiple positive electrodes 110, negative electrodes 120, and separators 140 may be stacked. Separator 140 provides physical separation between positive electrode 110 negative electrode 120 and prevent an electrical short between these electrodes while allow for ions migration between the electrodes.

C. Electrolyte

Separator 140 is configured to allow transport of first species 132 (identified as A in FIG. 1-7) between positive electrode 110 and negative electrode 120. At the same time, separator 140 is configured to block electrolyte solvent 134. Each component of electrochemical cell 100 will now be described in more detail. Some examples of first species 132 include, but are not limited to, atoms, ions, ion pairs, and molecules of the following examples, but not limited to, $H^+$, $Li^+$, $Na^+$, $K^+$, $Rb^+$, $Cs^+$, $Mg^{2+}$, $Ca^{2+}$, $F^-$, $Cl^-$, $Br^-$, $I^-$, $BF_4^-$, $PF_6^-$, $AsF_6^-$, $ClO_4^-$, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, di cyanotriazolate, dicyano-trifluoromethyl-imidazolate, dicyano-pentafluoroethyl-imidazoleate, and ion pairs thereof. Some specific examples of first species 132 include $H^+$, $Li^+$, $Na^+$, $Mg^{2+}$, $Ca^{2+}$, $PF_6^-$, methanesulfonate, and trifluoromethanesulfonate (which are utilized in many types of electrochemical storage devices and electrocatalytic cells). In some embodiments, the first species includes an ion having a charge of +1. In some embodiments, the first species is selected from the group consisting of $H^+$, $Li^+$, $Na^+$ and $K^+$. In some embodiments, the first species is selected from the group consisting of $F^-$, $Cl^-$, $Br^-$, $I^-$, $BF_4^-$, $PF_6^-$, $AsF_6^-$, $ClO_4^-$, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, di cyanotriazolate, dicyano-trifluoromethyl-imidazolate, and dicyano-pentafluoroethyl-imidazoleate.

Electrolyte solvent 134 include may be aqueous or non-aqueous. Some examples of non-aqueous electrolyte solvents include, but are not limited to cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), sulfones, nitriles, dinitriles, carboxylates, and combinations thereof. Acids such as $HSO_3CH_xF_y$ (where y=1−x) may be the electrolyte solvent—all species that are commonly utilized in electrochemical storage devices and electrocatalytic cells. For example, the transport of electrolyte solvent from the electrolyte to the negative electrode in a lithium-metal battery results in undesirable rapid cell capacity fade.

Electrolyte 130 may be aqueous or non-aqueous. Some examples of solvents used in a non-aqueous electrolyte include, but are not limited to cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), sulfones, nitriles, dinitriles, carboxylates, and combinations thereof. Acids such as $HSO_3CH_xF_y$ (where y=1−x) may be included in the electrolyte. A salt for liquid electrolytes may include one or more of the following: $LiPF_6$, $LiBF_4$, $LiClO_4$, $LiAsF_6$, $Li(CH_3SO_3)$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment the total concentration of salt in a liquid non-aqueous solvent (or combination of solvents) is at least about 0.3 M; in a more specific embodiment, the salt concentration is at least about 0.7 M. The upper concentration limit may be driven by a solubility limit or may be no greater than about 2.5 M; in a more specific embodiment, no more than about 1.5 M.

In one embodiment electrolyte additives, including but not limited to, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifluoromethyl-imidazolate, dicyano-pentafluoroethyl-imidazoleate, and vinylethylene carbonate (VEC) may be included in electrolyte 130.

III. Examples

Example 1: First Membrane Layer Preparation

An intrinsically microporous polymer, such as PIM-1, is dissolved in a suitable solvent, such as THF, or a mixture of solvents, at a concentration of 10-500 g $L^{-1}$ alongside a halide containing salt, such as lithium iodide, sodium iodide, potassium iodide, rubidium iodide, cesium iodide, magnesium iodide, tetramethylammonium iodide, tetraethylammonium iodide, tetrapropylammonium iodide, tetrabutylammonium iodide, lithium bromide, sodium bromide, potassium bromide, rubidium bromide, cesium bromide, magnesium bromide, tetramethyl ammonium bromide, tetraethylammonium bromide, tetrapropylammonium bromide, tetrabutylammonium bromide, lithium chloride, sodium chloride, potassium chloride, rubidium chloride, cesium chloride, magnesium chloride, tetramethylammonium chloride, tetraethylammonium chloride, tetrapropylammonium chloride, tetrabutylammonium chloride, lithium fluoride, sodium fluoride, potassium fluoride, rubidium fluoride, cesium fluoride, magnesium fluoride, tetramethylammonium fluoride, tetraethylammonium fluoride, tetrapropylammonium fluoride, and/or tetrabutylammonium fluoride at a concentration of 1-500 g $L^{-1}$.

The ink is coated optionally onto a lithium metal electrode or onto a porous support, such as Celgard, yielding either a protected lithium electrode or a coated separator. Optionally, the porous support can be coated on both sides with the ink yielding a doubly-coated separator. Optionally, an organic cation within the composite can be exchanged for an inorganic cation yielding a new composite.

In some specific cases hybrid separators (140) for electrochemical cell testing were prepared via solution processing onto a polypropylene substrate. A polymer ink solution at 50 mg/mL was coated onto a CELGARD 1611 substrate with a 20 μm Meyer Rod at 0.5 cm/s and then vacuum dried for 12 hours. The resulting hybrid separator is between 17-18 μm thick.

Example 2: Lithium-Metal Cell Cycling

Electrochemical cells ideally are assembled in either an argon-filled glovebox, a dry-room, or other suitably inert environment for handling lithium metal battery assembly.

Some electrochemical cells were assembled in a symmetric manner, consisting of a lithium metal electrode, a coated separator, a liquid electrolyte, a second coated separator, and a second lithium metal electrode. In each instance, the composite first membrane layer was in contact with the lithium metal surface. These symmetric cells could be cycled galvanostatically at 0.1-3 mA $cm^{-2}$, during which the overpotential for lithium metal plating could be measured, and from which the area specific resistance for plating could be calculated when considering the current density, and from which the observation of shorting by lithium metal dendrites could be observed as it varied by current density, areal capacity of lithium moved in each cycle, and the total number of plating and deplating cycles (FIG. 11-14).

Some electrochemical cells were assembled in an asymmetric manner, consisting of a lithium metal electrodes, a coated separator, an electrolyte, and a composite-coated copper electrode. Alternatively, asymmetric cells were assembled using a lithium metal electrode, a coated separator, an electrolyte, a second coated separator, and a copper current collector, optionally coated with lithium. These asymmetric cells could be cycled galvanostatically at 0.1-3 mA $cm^{-2}$, during which the overpotential for lithium metal plating could be measured, and from which the Coulombic efficiency could be calculated for each cycle, and from which the observation of shorting by lithium metal dendrites could be observed as it varied by current density, areal capacity of lithium moved in each cycle, and the total number of plating and deplating cycles. Unidirectional lithium plating could also be carried out to determine the short-circuit time as it varies by current density for a given composite formulation and electrolyte.

Some electrochemical cells were assembled, consisting of a lithium metal electrode, a coated separator, an electrolyte, and a composite cathode consisting of an active material, a conductive additive, and a binder. Alternatively, full cells were assembled, consisting of a protected lithium metal electrode, a separator, an electrolyte, and a composite cathode consisting of an active material, a conductive additive, and a binder. These full cells could be cycled galvanostatically at 0.1-10 mA cm', during which the accessible specific capacity could be determined, the overpotential required to kinetically access a specific current density, and the Coulombic efficiency.

Figure 15:
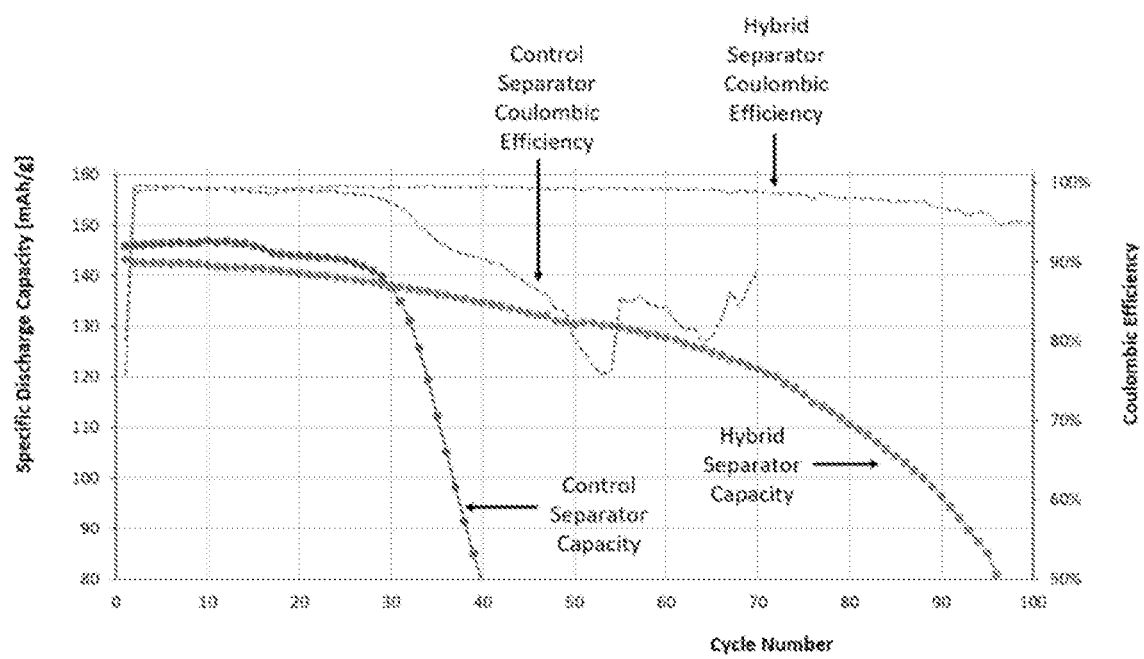
FIG. 15 is Galvanostatic cycling of a Li-NMC full cell from 3.0 V to 4.2 V with only membrane support (control) or with first membrane layer and membrane support (hybrid separator). Both discharge capacity and Coulombic efficiency are depicted.

Battery cycling lifetime tests were performed in full coin cells to compare the effect of dendrite growth prevention in hybrid separators in a battery application vs uncoated CELGARD 1611. Specifically, full cells were constructed using 316SS 2032 coin cell geometry. A 316SS wave spring of 15 mm diameter and 1.4 mm height was placed inside the positive cap of the coin cell, a 316SS spacer of 1.2 mm thickness was placed on top of the wave spring. A 622 nickel manganese cobalt oxide (NMC622) on aluminum cathode of 14.29 mm diameter was centered on top of the spacer. 30 μL of electrolyte (1:1:1 EC:EMC:DMC, 2 wt % VC, 1.2 M LiPF6, 20 wt % FEC) was applied onto the cathode. The separator or hybrid separator (19 mm diameter) was placed on top of the cathode, with the coated side facing away from the cathode in the case of the hybrid separator. Lastly, a lithium metal on copper anode of 15 mm diameter and 30 μm thickness of active material was centered on the stack and the negative cap placed on top and crimped to the positive cap. Lifetime cycling was performed within a 3.0-4.2 V voltage step with a constant current charge of 1.0 mA/$cm^2$, followed by a 4.2 V constant voltage step with a current cutoff of C/60, and finally a 1.0 mA/$cm^2$ discharge current. The results are shown in FIG. 15. The hybrid separator shows superior performance vs. the CELGARD baseline and cycles almost 2.5× longer before reaching a capacity loss of 70%.

Figure 16:
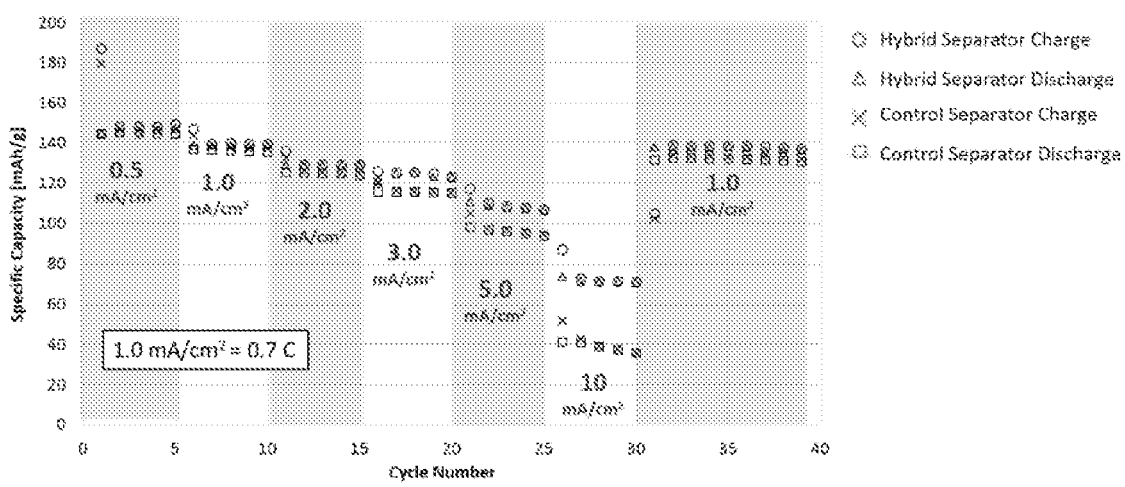
FIG. 16 is Galvanostatic cycling of a Li-NMC full cell from 3.0 V to 4.2 V with only membrane support (control) or with first membrane layer and membrane support (hybrid separator) at different current densities indicated.

Some cell cycling rate tests were performed in full coin cells to compare various charge and discharge rates of a hybrid separator vs. uncoated CELGARD 1611. Specifically, full cells were constructed using 316SS 2032 coin cell geometry. A 316SS wave spring of 15 mm diameter and 1.4 mm height was placed inside the positive cap of the coin cell, a 316SS spacer of 1.2 mm thickness was placed on top of the wave spring. A 622 nickel manganese cobalt oxide (NMC622) on aluminum cathode of 14.29 mm diameter was centered on top of the spacer. 30 μL of electrolyte (1:1:1 EC:EMC:DMC, 2 wt % VC, 1.2 M LiPF6, 20 wt % FEC) was applied onto the cathode. The separator or hybrid separator (19 mm diameter) was placed on top of the cathode, with the coated side facing away from the cathode in the case of the hybrid separator. Lastly, a lithium metal on copper anode of 15 mm diameter and 30 μm thickness of active material was centered on the stack and the negative cap placed on top and crimped to the positive cap. The cells were then charged and discharged at various current densities at a constant voltage step of 3.0-4.2 V with a cutoff current of C/60. Each charge and discharge was at the same current density and cycled 5 times per rate and then returned to a currently density of 1.0 mA/cm$^2$ for 10 additional cycles. The current densities are as follows: 0.5 mA/cm$^2$, 1.0 mA/cm$^2$, 2.0 mA/cm$^2$, 3.0 mA/cm$^2$, 5.0 mA/cm$^2$, 10.0 mA/cm$^2$, and then again 1.0 mA/cm$^2$. The results are shown in FIG. 16. The hybrid separator and the CELGARD baseline are analogous in capacity retention with an increasing rate of charge/discharge at lower current densities, while the hybrid separator retains a significantly higher capacity at the higher rate of charge/discharge.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A composition comprising:
    a microporous polymer having a plurality of void spaces with a porosity from at least 5% (v/v) to 50% (v/v), wherein the microporous polymer comprises a polymer of intrinsic microporosity; and
    an inorganic component comprising a halide containing salt occupying the void spaces,
    wherein the inorganic component is present in at least 5% (w/w),
    wherein the composition is ionically conductive.
2. The composition of claim 1, wherein the inorganic component is structured with domains nominally at a length scale of 0.5-2 nanometers.
3. The composition of claim 1, wherein the microporous polymer comprises a linear polymer, a branched polymer, or a network polymer with high fractional free volume.
4. The composition of claim 1, wherein the porosity of the microporous polymer is from at least 10% (v/v) to 50% (v/v).
5. The composition of claim 1, wherein the porosity of the microporous polymer is about 20% (v/v).
6. The composition of claim 1, wherein the inorganic component comprises lithium iodide, sodium iodide, potassium iodide, rubidium iodide, cesium iodide, magnesium iodide, tetramethylammonium iodide, tetraethylammonium iodide, tetrapropylammonium iodide, tetrabutylammonium iodide, lithium bromide, sodium bromide, potassium bromide, rubidium bromide, cesium bromide, magnesium bromide, tetramethylammonium bromide, tetraethylammonium bromide, tetrapropylammonium bromide, tetrabutylammonium bromide, lithium chloride, sodium chloride, potassium chloride, rubidium chloride, cesium chloride, magnesium chloride, tetramethylammonium chloride, tetraethylammonium chloride, tetrapropylammonium chloride, tetrabutylammonium chloride, lithium fluoride, sodium fluoride, potassium fluoride, rubidium fluoride, cesium fluoride, magnesium fluoride, tetramethylammonium fluoride, tetraethylammonium fluoride, tetrapropylammonium fluoride, and/or tetrabutylammonium fluoride.
7. The composition of claim 1, wherein the inorganic component comprises an alkali metal ion.
8. The composition of claim 1, wherein the inorganic component is present in at least 10% (w/w).
9. The composition of claim 1, wherein the inorganic component is present in at least 20% (w/w).
10. A composition of claim 1, prepared by solution casting with the polymer, in-polymer-pore transformation of inorganic precursors, vapor deposition, or chemical transformation with the polymer.
11. An electrode comprising:
    a metallic anode comprising of Li, Na, K, Mg, Ca, Zn, Al, Si, Ge, Sn, or an alloy thereof; and
    a composition of claim 1, coated on the metallic anode.
12. A separator comprising:
    a porous support; and
    a composition of claim 1, coated on the porous support.
13. An electrode-separator laminate comprising:
    a metallic anode comprising of Li, Na, K, Mg, Ca, Zn, Al, Si, Ge, Sn, or an alloy thereof; and
    a separator of claim 12, coated on the metallic anode.
14. An electrochemical cell comprising:
    an anode of claim 11;
    an electrolyte; and
    a cathode.
15. The electrochemical cell of claim 14, further comprising:
    a separator comprising:
        a porous support, and
        a composition comprising a microporous polymer having a plurality of void spaces with a porosity from at least 5% (v/v) to 50% (v/v); and
            an inorganic component occupying the void spaces, wherein the inorganic component is present in at least 5% (w/w),
            wherein the composition is ionically conductive, and wherein the composition is coated on the porous support.

* * * * *